US012655668B2

(12) United States Patent
Lundqvist et al.

(10) Patent No.: US 12,655,668 B2
(45) Date of Patent: Jun. 16, 2026

(54) SLIDE RAIL WITH AN OPEN CHANNEL

(71) Applicant: Inter IKEA Systems B.V., LN Delft (NL)

(72) Inventors: Mats Lundqvist, Lönsboda (SE); Mikael Fors, Skottorp (SE)

(73) Assignee: Inter IKEA Systems B.V., Delft (NL)

( * ) Notice: Subject to any disclaimer, the term of this patent is extended or adjusted under 35 U.S.C. 154(b) by 0 days.

(21) Appl. No.: 18/860,974

(22) PCT Filed: Apr. 26, 2023

(86) PCT No.: PCT/EP2023/060932
§ 371 (c)(1),
(2) Date: Oct. 28, 2024

(87) PCT Pub. No.: WO2023/209001
PCT Pub. Date: Nov. 2, 2023

(65) Prior Publication Data

US 2025/0290363 A1 Sep. 18, 2025

(30) Foreign Application Priority Data

Apr. 28, 2022 (SE) .................................... 2250507-7

(51) Int. Cl.
*E05D 15/06* (2006.01)

(52) U.S. Cl.
CPC ..... *E05D 15/0686* (2013.01); *E05D 15/0652* (2013.01); *E05D 15/0656* (2013.01); *E05D 15/0691* (2013.01); *E05Y 2800/676* (2013.01)

(58) Field of Classification Search
CPC ............ E05D 15/0686; E05D 15/0652; E05D 15/0656; E05D 15/0691; E05D 15/0682; E06B 3/4663
See application file for complete search history.

(56) References Cited

U.S. PATENT DOCUMENTS 1,448,845 A * 3/1923 Johnson .................... E06B 3/50 49/260
7,743,557 B2 * 6/2010 Liao .................... E05D 15/0652 49/425

(Continued)

FOREIGN PATENT DOCUMENTS

DE 29813478 U1 11/1998
DE 202009004790 U1 9/2010

(Continued)

OTHER PUBLICATIONS

International Search Report mailed Aug. 28, 2023, for International Application No. PCT/EP2023/060932.

*Primary Examiner* — Jeffrey O'Brien
(74) *Attorney, Agent, or Firm* — Renner, Otto, Boisselle & Sklar, LLP

(57) ABSTRACT

Slide rails, sliding arrangements and sliding screen systems are disclosed. A slide rail for a sliding screen system comprises an elongate bar body for insertion in a recess of a board, the elongate bar body comprising a plurality of walls forming at least one open channel extending along a longitudinal axis of the slide rail, wherein the plurality of walls comprises a first wall and a second wall arranged opposite to each other and a third wall arranged between and connected to the first and second walls, at least one flange extending away from the open channel from a side of the elongate bar body, and at least one slide surface extending in parallel to the longitudinal axis of the slide rail, the slide surface being configured to receive a sliding member of the sliding arrangement of the sliding screen system.

18 Claims, 12 Drawing Sheets

(56) References Cited

U.S. PATENT DOCUMENTS

| | | | | |
|---|---|---|---|---|
| 8,074,699 | B2 * | 12/2011 | Jones | E06B 3/4636 160/40 |
| 8,850,659 | B2 * | 10/2014 | Ewing | E05D 15/0634 16/105 |
| 9,145,723 | B2 * | 9/2015 | Garrett, III | E04F 19/02 |
| 10,441,069 | B2 * | 10/2019 | Andersson | A47B 1/08 |
| 10,844,906 | B2 * | 11/2020 | Andersson | F16C 33/203 |
| 11,187,020 | B2 * | 11/2021 | Andersson | E05D 15/0682 |
| 11,578,754 | B2 * | 2/2023 | Andersson | E05D 15/0647 |
| 2020/0071631 | A1 * | 3/2020 | Andersson | C10M 129/20 |
| 2025/0027535 | A1 * | 1/2025 | Käll | E05D 15/0652 |

FOREIGN PATENT DOCUMENTS

| | | | | |
|---|---|---|---|---|
| EP | 0940544 | A2 | 9/1999 | |
| EP | 0940544 | A3 | 11/2003 | |
| EP | 2248977 | A2 | 11/2010 | |
| EP | 2248977 | A3 | 8/2014 | |
| FR | 1467583 | A | 1/1967 | |
| WO | 2017042201 | A1 | 3/2017 | |
| WO | WO-2018004450 | A1 * | 1/2018 | E05D 15/0647 |

* cited by examiner

SLIDE RAIL WITH AN OPEN CHANNEL

This application is a national phase of International Application No. PCT/EP2023/060932 filed Apr. 26, 2023, which claims priority to Swedish Application No. 2250507-7 filed Apr. 28, 2022, each of which is hereby incorporated herein by reference in its entirety.

TECHNICAL FIELD

This disclosure relates to a slide rail, for example for use with a sliding screen. In particular, the disclosure relates to a slide rail for a sliding arrangement, sliding arrangements comprising the slide rail, and sliding screen systems comprising the sliding arrangements.

BACKGROUND

Linear plain furniture bearings in the form of slide systems are known in the art and have been used in several constructions within the home, including extendable tables, chests of drawers, extendable sofa beds, sliding doors, and the like. They are relatively simple, reliable constructions, and are easy to use. In particular, wardrobes having sliding doors are well known in the art (see, for example, DE 298 13 478). Typically, the doors are arranged with supportive ball bearings, e.g. wheels rolling over a rail, at the upper end of the door and steering means, e.g. pins, at the lower end. Ball bearings work well, but suffer from being somewhat dust sensitive. When ball bearings are used, start-stop resistance is very low, meaning that, in some cases, a sliding door can be moved from its resting position too easily. At the end-positions, this may be partly overcome by providing resting end-positions provided with, for example, heads or recesses for the wheels. However, this does not overcome the low start-stop resistance at intermediate positions.

Sliding kitchen doors, which are less heavy than wardrobe sliding doors, are typically not provided with ball bearings, but mounted standing in a sliding groove, i.e. a linear plain bearing. This may work well for lighter doors, although the sliding resistance may be high, especially at the start of movement. However, for heavier doors, e.g. wardrobe sliding doors, linear plain bearings typically provide too much sliding resistance for practical use, especially at the start of movement. Further, such linear plain bearings are sensitive to dust contamination affecting the sliding resistance very negatively.

WO 2017/042201 discloses a sliding screen system for a sliding screen comprising a linear slide rail and at least one sliding member. The linear slide rail is preferably a metal rail, such as an aluminum rail or a steel rail, and has a slide surface coated with a lacquer comprising a resin and a lipophilic composition coating. Metal slide rails are heavy, rigid, require surface treatment such as lacquer coating, and are complex and expensive to manufacture.

Therefore, it is of interest to provide a simple, inexpensive, safe means for providing a sliding arrangement with lowered friction for lighter sliding furniture applications. The lowered friction should preferably be permanent and easy to manufacture. Further, the sliding arrangement should preferably be essentially maintenance-free. Specifically, it is desired to provide a slide rail and sliding arrangement with very low sliding friction. Such a slide rail and sliding arrangement may find use in sliding screen systems, e.g. with wardrobe sliding doors. In particular, the slide rail may find use in wardrobes, cupboards, and the like with sliding doors and a lower board in which the rail is to be assembled.

SUMMARY

The present disclosure seeks to mitigate, alleviate, eliminate or circumvent one or more of the above-identified deficiencies and disadvantages in the art singly or in any combination by providing a slide rail for a sliding arrangement. The slide rail comprises an elongate bar body for insertion in a recess of a board, the elongate bar body comprising an open channel along its longitudinal axis, and at least one flange extending away from the open channel from a side of the elongate bar body. At least one slide surface is present on the slide rail and configured to receive a sliding member of a sliding arrangement. The slide surface can be on the flange or in the channel, allowing the slide rail to be used in different configurations. The flange can be configured to support a vertical load associated with the slide rail, which ensures free movement of associated equipment along the slide rail, as there does not need to be load-bearing contact between the associated equipment and the slide rail. The slide rail can be made of plastic, and can therefore avoid the disadvantages associated with metal slide rails. This provides for a low friction slide rail and sliding arrangement with efficient function in many applications, including furniture applications such as sliding doors, drawers, tables, extendable bed frames and extendable beds, etc.

According to an aspect, there is provided a slide rail for a sliding screen system, the slide rail comprising an elongate bar body for insertion in a recess of a board, the elongate bar body comprising a plurality of walls forming at least one open channel extending along a longitudinal axis of the slide rail, wherein the plurality of walls comprises a first wall and a second wall arranged opposite to each other and a third wall arranged between and connected to the first and second walls, at least one flange extending away from the at least one open channel from a side of the elongate bar body, and at least one slide surface extending in parallel to the longitudinal axis of the slide rail, the slide surface being configured to receive a sliding member of a sliding arrangement of the sliding screen system.

Optionally, the slide surface is formed as a groove in the slide rail extending along the slide rail. Optionally, a slide surface is disposed on a surface of the third wall of the elongate bar body adjacent to the channel. Optionally, the at least one flange extends away from the at least one open channel from a side of the elongate bar body in a plane parallel to the third wall and/or in a plane perpendicular to the first and/or second wall. Optionally, the at least one flange is configured to support a vertical load applied to the slide rail, preferably wherein a support surface of the at least one flange facing in a direction towards the third wall of the elongate bar body is configured to interface with the board to support the vertical load. Optionally, the at least one flange comprises a first flange extending away from the first wall of the elongate bar body and a second flange extending away from the second wall of the elongate bar body in a direction opposite to the extension of the first flange. Optionally, the first and second walls are arranged parallel to each other and the third wall is arranged perpendicular to the first and second walls. Optionally, the slide rail is linear.

Optionally, the slide rail is formed of plastic, preferably a plastic comprising a polymer selected from the group of polymers consisting of polyoxymethylenes (POM), polymethyl methacrylate (PMMA), polycarbonate (PC), polypropylene (PP), polypropylene copolymers (PPCO), polyesters (e.g. thermoplastic polyesters, such as polyethylene terephthalate (PET)), polytrimethylene terephthalate (PTT), polybutylene terephthalate (PBT), and polylactic acid (PLA), as well as bio-based thermoplastic polyesters, as such polyhydroxyalkanoates (PHA), polyhydroxybutyrate (PHB), and polyethylene furanoate (PEF)), polyamides (PA), such as polyamide 6 (PA6), polyvinyl chloride (PVC), polyphenylene sulfide (PPS), polyaryletherketone (PAEK, e.g. Polyether ether ketone (PEEK)), and Polytetrafluoroethylene (PTFE), more preferably said plastic comprising a polymer selected from the group of polymers consisting of PA, PC, PPCO, polyester, and PMMA, and/or wherein the slide rail is formed by extrusion molding. Optionally, the slide rail is formed of metal, preferably wherein the at least one slide surface is coated with a lacquer comprising a resin. Optionally, the at least one slide surface is at least partly coated with a lipophilic composition coating to provide a slide layer with lowered friction.

Optionally, a slide surface is disposed on a surface of the flange facing in a direction away from the third wall of the elongate bar body. Optionally, the open channel is configured to receive a guide component of the sliding arrangement. Optionally, an inner surface of the at least one flange comprises a blade element configured to engage a corresponding surface of the guide component, and/or an inner surface of the at least one flange is configured to engage a corresponding blade element of the guide component. Optionally, an inner part of the at least one flange extends into the channel.

Optionally, the plurality of walls further comprises a fourth wall arranged between the first and second walls and connected to the third wall. Optionally, a first open channel is formed by the first, third and fourth walls, and a second open channel is formed by the second, third and fourth walls. Optionally, a first slide surface is disposed on a surface of the third wall adjacent the first open channel, and a second slide surface is disposed on a surface of the third wall adjacent the second open channel. Optionally, each open channel is configured to receive a respective sliding member of a respective sliding arrangement. Optionally, the at least one slide surface is formed as a groove in the third wall such as a V-shaped or U-shaped track. Optionally, the at least one flange comprises a first flange extending away from the first open channel from the first wall of the elongate bar body and a second flange extending away from the second open channel from the second wall of the elongate bar body in a direction opposite to the extension of the first flange. Optionally, the first, second and fourth walls are arranged parallel to each other and the third wall is arranged perpendicular to the first, second and fourth walls.

According to another aspect, there is provided a sliding arrangement comprising a slide rail and at least one sliding member configured to contact a slide surface of the slide rail and slide along the slide surface in a direction parallel to the longitudinal axis of the slide rail. Optionally, the sliding member comprises at least one blade element extending parallel or perpendicular to the sliding direction and configured to provide the contact with the slide surface. Optionally, the sliding member is arranged to slide on a slide surface arranged on at least one flange, preferably the slide surface being arranged as a groove in the flange and extending along the slide rail. Optionally, the sliding arrangement further comprises a guide component arranged to be received in the open channel of the slide rail. Optionally, the sliding member is coupled to the guide component.

According to another aspect, there is provided a sliding member for a sliding arrangement, the sliding member comprising an elongate bar body for insertion in an open channel of a slide rail of the sliding arrangement, the elongate bar body comprising a plurality of walls forming an open channel extending along a longitudinal axis of the sliding member, wherein first and second walls are arranged opposite to each other and a third wall is arranged between the first and second walls, and a contact portion extending in parallel to the longitudinal axis of the sliding member formed on a surface of the third wall facing away from the open channel.

Optionally, the slide surface has a V-shape or a U-shape. Optionally, the open channel is configured to receive a sliding screen. Optionally, the sliding member of the sliding arranged comprises such a sliding member. Optionally, the sliding arrangement comprises a slide rail, a first sliding member configured to contact a first slide surface of the slide rail, and a second sliding member configured to contact a second slide surface of the slide rail.

According to another aspect, there is provided a sliding screen system comprising at least one sliding arrangement, and at least one sliding screen connected to the sliding member of the sliding arrangement.

Optionally, the slide rail and the sliding arrangement are arranged at a lower portion of the sliding screen system, and the flange of the slide rail is configured to bear a vertical load applied to the sliding screen system, for example a vertical load applied by the at least one sliding screen. Optionally, a lower surface of the flange is configured to interface with the board to support the vertical load.

Optionally, the slide surface of the slide rail is disposed on an upper surface of a flange of the slide rail. Optionally, the sliding screen is coupled to a guide component of the sliding arrangement, preferably wherein the guide component is at least partly arranged in the channel of the slide rail.

Optionally, the sliding screen system comprises a first sliding arrangement, a second sliding arrangement, a first sliding screen connected to the sliding member of the first sliding arrangement, and a second sliding screen connected to the sliding member of the second sliding arrangement.

Optionally, the slide rail and the sliding arrangement are arranged at an upper portion of the sliding screen system, and the slide surface of the slide rail is disposed on the lower surface of the third wall of the elongate bar body. Optionally, the sliding member of the sliding arrangement is coupled to a guide component, preferably wherein the guide component is at least partly arranged in the channel of the slide rail of the sliding arrangement. Optionally, the sliding member of the sliding arrangement is configured to exert a spring force against the slide surface.

According to another aspect, there is provided a sliding screen system comprising a first slide rail arranged at a lower portion of the sliding screen system, wherein the at least one flange of the first slide rail is configured to bear a vertical load applied to the sliding screen system, at least one first sliding member in contact with the slide surface of the first slide rail and configured to slide along the slide surface in a direction parallel to the longitudinal axis of the first slide rail, a second slide rail arranged at an upper portion of the sliding screen system, wherein the slide surface of the second slide rail is disposed on a surface of the third wall of the elongate bar body of second slide rail, at least one second sliding member in contact with the slide surface of the second slide rail and configured to slide along the slide surface in a direction parallel to the longitudinal axis of the second slide rail, and at least one sliding screen connected to the first and second sliding members.

Optionally, a lower surface of the at least one flange of the first slide rail is configured to interface with a lower board to support the vertical load. Optionally, the first slide rail is arranged in the vertically opposite sense to the second slide rail.

BRIEF DESCRIPTION OF THE DRAWINGS

Exemplary embodiments of the disclosure shall now be described with reference to the drawings in which.

Throughout the description and the drawings, like reference numerals refer to like parts.

DETAILED DESCRIPTION

The following disclosure relates to a slide rail for a sliding arrangement, sliding arrangements comprising the slide rail, and sliding screen systems comprising the sliding arrangements. The slide rail, sliding arrangements, and sliding screen systems disclosed herein provide simpler, safer, inexpensive, easy to manufacture, and essentially maintenance-free means for providing sliding with lowered friction for lighter sliding furniture applications.

Figure 1:
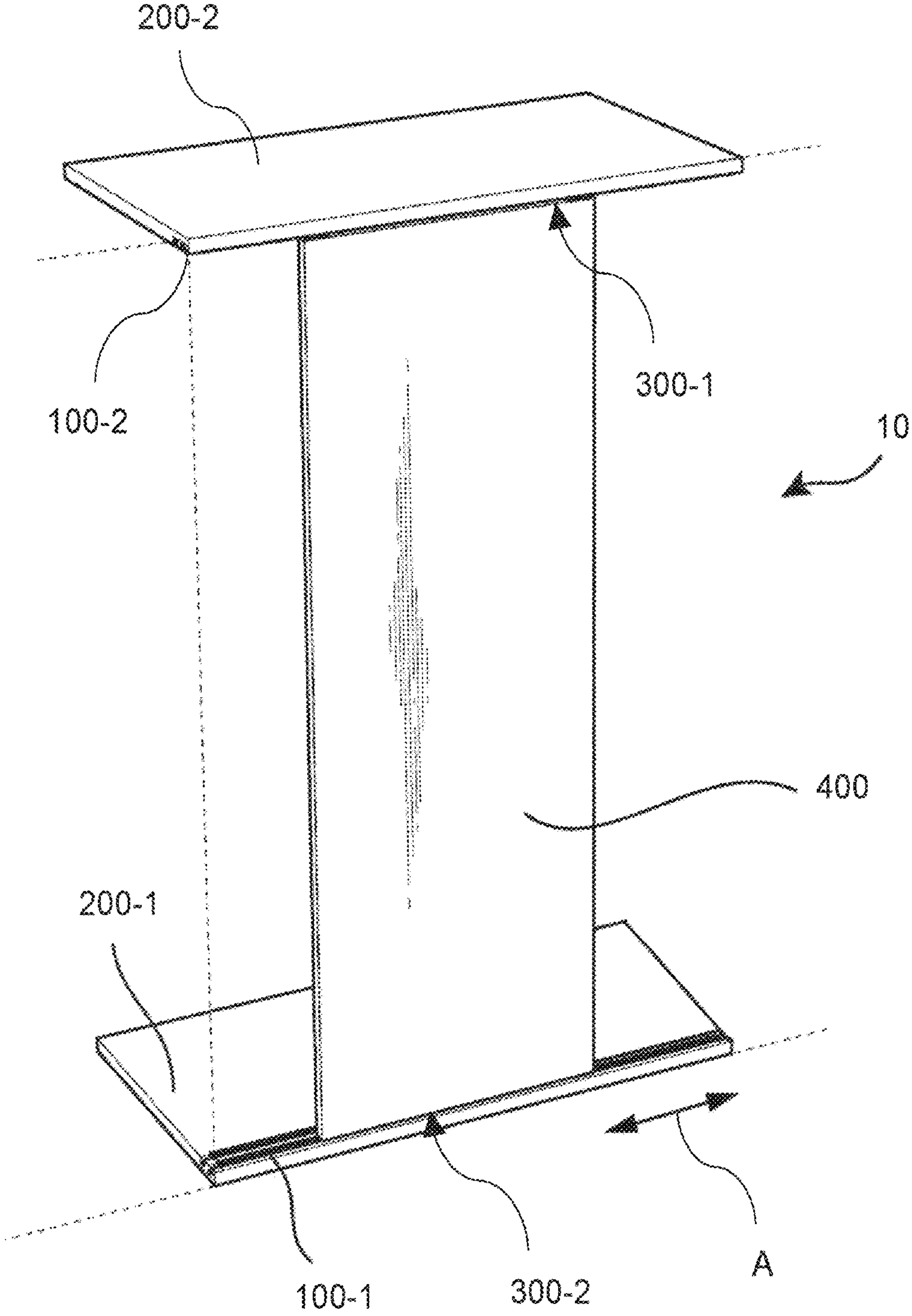
FIG. 1 shows a perspective view of a first sliding screen system.

FIG. 1 is a perspective view of a first sliding screen system 10 for a sliding door comprising a sliding screen 400, a first or main sliding arrangement 300-1 and a second or auxiliary sliding arrangement 300-2. The main sliding arrangement 300-1 is arranged at a lower end of the sliding screen system 10 and adapted to carry a weight of the sliding screen 400. The auxiliary sliding arrangement 300-2 is arranged at an upper end of the sliding screen system 10 and is adapted for steering the sliding screen 400 during a sliding movement defined by the main sliding arrangement 300-1.

Each one of the main sliding arrangement 300-1 and the auxiliary sliding arrangement 300-2 comprises a slide rail 100. A first slide rail 100-1 is adapted for being rigidly connected to a lower platform 200-1 in a recessed configuration, so that the sliding screen 400 may be moved relative to the lower platform 200-1. The slide rail 100-1 is adapted to carry the weight of the sliding screen 400. A second slide rail 100-2 is adapted for being rigidly connected to an upper platform 200-2 in a recessed configuration. The sliding screen 400 is configured to slide along the slide rails 100 in a sliding direction A relative to the platforms 200.

Each one of the lower platform 200-1 and the upper platform 200-2 forms a part of a piece of furniture, in this case a lower panel and an upper panel of a wardrobe. The sliding screen system 10 may alternatively be arranged in a cabinet, cupboard, sideboard or chest of drawers or for a sliding door that is slidable in relation to a structure, such as a wall/floor/ceiling in a building.

Figure 2:
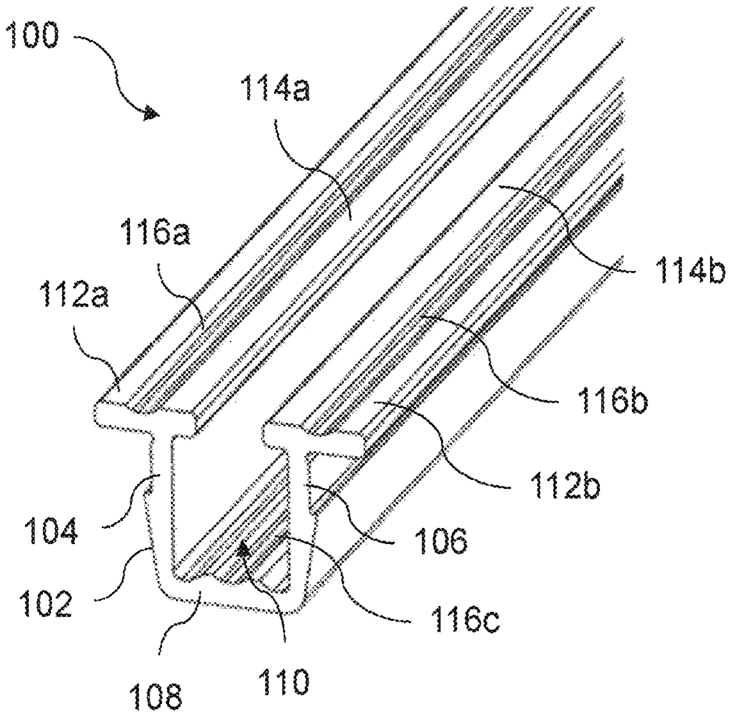
FIG. 2 shows a perspective view of a slide rail according to a first embodiment.

FIG. 2 shows a perspective view of a slide rail 100 for a sliding arrangement according to a first embodiment of the disclosure. The slide rail 100 may be the slide rail 100-1 or the slide rail 100-2 shown in FIG. 1. The slide rail 100 comprises an elongate bar body 102 having a plurality of walls 104, 106, 108 forming an open channel 110 extending along a longitudinal axis of the slide rail 100. In FIG. 2, the elongate bar body 102 is shown having three walls forming a generally U-shaped body. Specifically, a first wall 104 is arranged opposite a second wall 106, these two walls forming the sides of the U-shape, and a third wall 108 is arranged between the first and second walls 104, 106, this third wall 108 forming the bottom of the U-shape. In the embodiment of FIG. 2, the first and second walls 104, 106 are arranged parallel to each other, and the third wall 108 is arranged perpendicular to the first and second walls 104, 106. However, it will be envisaged that the walls 104, 106, 108 could be formed with different relative angles that still form an open channel 110 in the elongate bar body 102. For example, the first and second walls 104, 106 could slope inwardly or outwardly from the third wall 108, either symmetrically or asymmetrically. In one example, the first and second walls 104, 106 may form a V-shape, with no third wall 108 present. In other example, more than three walls could be present. For example, intermediate walls could connect each of the first and second walls 104, 106 to the third wall 108. Different cross-sections of the slide rail 100 are therefore readily envisaged by the skilled person.

The slide rail 100 further comprises at least one flange 112*a*, 112*b*. In FIG. 2, two flanges 112*a*, 112*b* are shown connected to each of the first and second walls 104, 106. The flanges 112*a*, 112*b* extend substantially away from the open channel 110 from a side of the elongate bar body 102. That is to say, the flanges 112*a*, 112*b* extend outwardly from the elongate bar body 102. Specifically, the first flange 112*a* extends away from the open channel 110 from the first wall 104, and the second flange 112*b* extends away from the open channel 110 from the second wall 106 of the elongate bar body 102 in a direction opposite and parallel to the extension of the first flange 112*a*. As will be explained in relation to FIGS. 3 and 4, the flanges 112*a*, 112*b* are parallel to the top surface of a board into which the slide rail 100 is installed, such as the boards 200 shown in FIG. 1.

In the embodiment shown in FIG. 2, where the first, second and third walls 104, 106, 108 are arranged orthogonally (i.e. at right angles to each other), the extension of the flanges 112*a*, 112*b* is substantially in a plane perpendicular to the first and second walls 104, 106 and parallel to the third wall 108. In other embodiments, the first and second walls 104, 106 may not be perpendicular to the third wall 108. In these embodiments, the arrangement of the flanges 112*a*, 112*b* is dependent on the positioning of the slide rail 100 when it is inserted into a board. For example, if the third wall 108 is not arranged horizontally, the flanges 112*a*, 112*b* may extend substantially in a plane perpendicular to the first and second walls 104, 106, but not parallel to the third wall 108. Similarly, if the first and second walls 104, 106 are not arranged vertically, the flanges 112*a*, 112*b* may extend substantially in a plane parallel to the third wall 108, but not perpendicular to the first and second walls 104, 106.

The flanges 112*a*, 112*b* may optionally comprise respective inner parts 114*a*, 114*b* that extend into the channel 110. The inner parts 114*a*, 114*b* may interact with a guide component of a sliding arrangement once the slide rail is installed, as will be described in relation to FIGS. 4 to 8. Whilst two flanges 112*a*, 112*b* are shown in FIG. 2, it will be appreciated that only a single flange may be present, extending from either the first wall 104 or the second wall 106.

The slide rail 100 further comprises at least one slide surface 116*a-c* extending parallel to the longitudinal axis of the slide rail 100. The slide surfaces 116*a-c* are configured to receive a sliding member of a sliding arrangement, as will be explained in relation to FIGS. 4 and 5. The sliding member may be coupled to a sliding screen, such as the sliding screen 400 of FIG. 1, as will be explained in relation to FIGS. 6 to 8. The slide surfaces 116*a-c* are formed as grooves or recesses in the slide rail 100, and extend along the length of the slide rail 100. Forming the slide surfaces 116*a-c* as grooves improves the control of the lateral position of the sliding member in relation to the slide rail 100 when the sliding member slides along the slide rail 100. In FIG. 2, three slide surfaces 116*a-c* are shown corresponding to each of the first and second flanges 112*a*, 112*b* and the third wall 108. However, it will be appreciated that, alternatively, only a single slide surface may be present on either the first flange 112*a*, the second flange 112*b*, or the third wall 108, or two slide surfaces may be provided on two of these elements.

The slide surfaces 116*a-c* may be at least partly coated with a lipophilic composition coating to provide a slide layer with lowered friction. The lipophilic composition coating may comprise compounds comprising C6 to C40, such as C8 to C30, or even C10 to C24, non-aromatic hydrocarbyl groups, such as alkenyl groups and/or alkyl groups, e.g. alkyl groups. Further detail of suitable lipophilic compositions is disclosed in WO 2017/042201 and WO 2018/160127.

In some embodiments, the slide rail 100 is formed of plastic, preferably a plastic comprising a polymer selected from the group of polymers consisting of polyoxymethylenes (POM), polymethyl methacrylate (PMMA), polycarbonate (PC), polypropylene (PP), polypropylene copolymers (PPCO), polyesters (e.g. thermoplastic polyesters, such as polyethylene terephthalate (PET)), polytrimethylene terephthalate (PTT), polybutylene terephthalate (PBT), and polylactic acid (PLA), as well as bio-based thermoplastic polyesters, such as polyhydroxyalkanoates (PHA), polyhydroxybutyrate (PHB), and polyethylene furanoate (PEF), polyamides (PA), such as polyamide 6 (PA6), polyvinyl chloride (PVC), polyphenylene sulfide (PPS), polyaryletherketone (PAEK), e.g. Polyether ether ketone (PEEK), and Polytetrafluoroethylene (PTFE), more preferably said plastic comprising a polymer selected from the group of polymers consisting of PA, PC, PPCO, and PMMA. By forming the slide rail 100 of plastic, rather than metal, the disadvantages associated with metal slide rails are mitigated. In particular, plastic slide rails are less heavy, less rigid, do not require surface treatment such as lacquer coating, and are less complex and expensive to manufacture. For example, in some embodiments, the slide rail 100 is formed by extrusion molding. In some embodiments, the slide rail 100 may be formed by injection molding.

In other embodiments, the slide rail 100 may be formed of metal, such as aluminium or steel. In these embodiments, the at least one slide surface 116*a-c* may be coated with a lacquer comprising a resin, for example an acrylic resin, with a lipophilic composition, such as those discussed above.

The slide rail 100 may be substantially linear, to allow for linear movement of a sliding member along the longitudinal axis of the slide rail. In other embodiments, the slide rail 100 may have a generally curved form along its longitudinal axis, in order to allow movement along a smooth curve.

Figure 3:
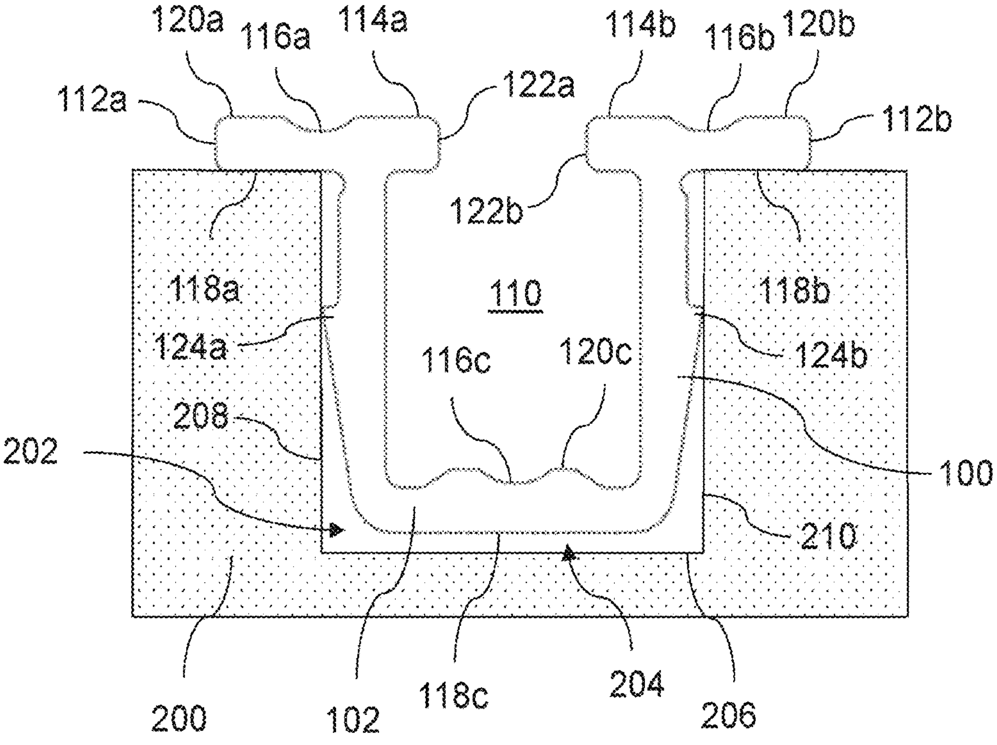
FIG. 3 shows a cross-sectional view of the slide rail of FIG. 2.

FIG. 3 shows a cross-sectional view of the slide rail 100 of FIG. 2 installed in a board 200, such as the board 200-1 of FIG. 1. The board 200 may be fibre board, e.g. MDF or HDF, or particle board (also known as chipboard). As can be seen in FIG. 3, the elongate bar body 102 is inserted in a recess 202 of the board 200.

When installed in the board 200, the flanges 112*a*, 112*b* are configured to support a vertical load applied to the slide rail 100. In some embodiments, a support surface 118, 118*b* of each flange 112*a*, 112*b* is configured to interface with the board 200 to support the vertical load. In these embodiments, a bottom surface 118*c* of the third wall 108 may or may not also interface with the board 200, thereby forming a gap 204 between the bottom surface 118*c* and the bottom 206 of the recess 202. In some embodiments, the bottom surface 118*c* of the third wall 108 may support the vertical load applied to the slide rail 100. This ensures free movement of a sliding screen along the slide rail 100, as there does not need to be load-bearing contact elsewhere between the sliding screen and the slide rail 100. In cases where the bottom surface 118*c* of the third wall 108 does not interface with the board 200, the vertical load is supported by the flanges 112*a*, 112*b*. This provides a tolerance for the depth of the recess 202 and insertion of the slide rail 100 into the recess 202 of the board 200. In this way, the recess 202 can be made sufficiently deep to ensure that contact between the slide rail 100 and the board 200 is made at the support surfaces 118*a*, 118*b*.

As shown in FIG. 3, the slide surfaces 116*a-c* are formed on surfaces 120*a-c* opposite the support surfaces 118*a-c*. In the orientation of FIGS. 2 and 3, the slide surfaces 116*a-c* are formed on upper surfaces 120*a*, 120*b* of the first and second flanges 112*a*, 112*b* and the third wall 108. The upper surfaces 120*a*, 120*b* of the first and second flanges 112*a*, 112*b* can be considered facing in a direction away from the third wall 108 of the elongate bar body 102, and the support surfaces 118*a*, 118*b* can be considered facing in a direction towards the third wall 108 of the elongate bar body 102. The upper surface 120*c* of the third wall 108 can be considered as the surface of the third wall 108 that is adjacent to the channel 110. Put alternatively, the support surfaces 118*a*, 118*b* can be considered to face towards the third wall 108, while the surfaces 120*a*, 120*b* can be considered to face away from the third wall 108.

In operation, and as will be explained in relation to FIG. 4A, the channel 110 is configured to receive a guide component of a sliding arrangement. The guide component may be coupled to a sliding screen, such as the sliding screen 400 of FIG. 1. As such, the guide component serves to maintain the sliding screen in position as it moves along the length of the slide rail 100, and ensure a good contact is formed between the sliding member and the relevant slide surface.

The flanges 112*a*, 112*b* each comprise an inner surface 122*a*, 122*b*. The inner surfaces 122*a*, 122*b* may be configured to interface with the guide component. This provides improved contact and reduced friction between the guide component and the slide rail 100 along the length of the slide rail 100. In some embodiments, the inner surface 122*a*, 122*b* of at least one flange 112*a*, 112*b* may be configured to engage a corresponding blade element of the guide component, as will be explained in relation to FIG. 4A. In some embodiments, the inner surface 122*a*, 122*b* of at least one flange 112*a*, 112*b* may comprise a blade element configured to engage a corresponding surface of the guide component, as will be explained in relation to FIG. 4B. The inner surfaces 122*a*, 122*b* may be present on respective inner parts 114*a*, 114*b* of the flanges 112*a*, 112*b* or, if the inner parts 114*a*, 114*b* are absent, be part of the first and second walls 104, 106.

The first and second walls 104, 106 may each further comprise a ridge 124*a*, 124*b* disposed on the outer surface of the respective wall and extending along the length of the slide rail 100. The ridges 124*a*, 124*b* serve to increase friction between the slide rail 100 and the board 200 when the slide rail 100 is installed. In particular, the ridges 124*a*, 124*b* contact the side surfaces 208, 210 of the recess 202 when the slide rail 100 is installed in the board 200, and resist movement of the slide rail 100 out of the recess 202.

Figure 4A:
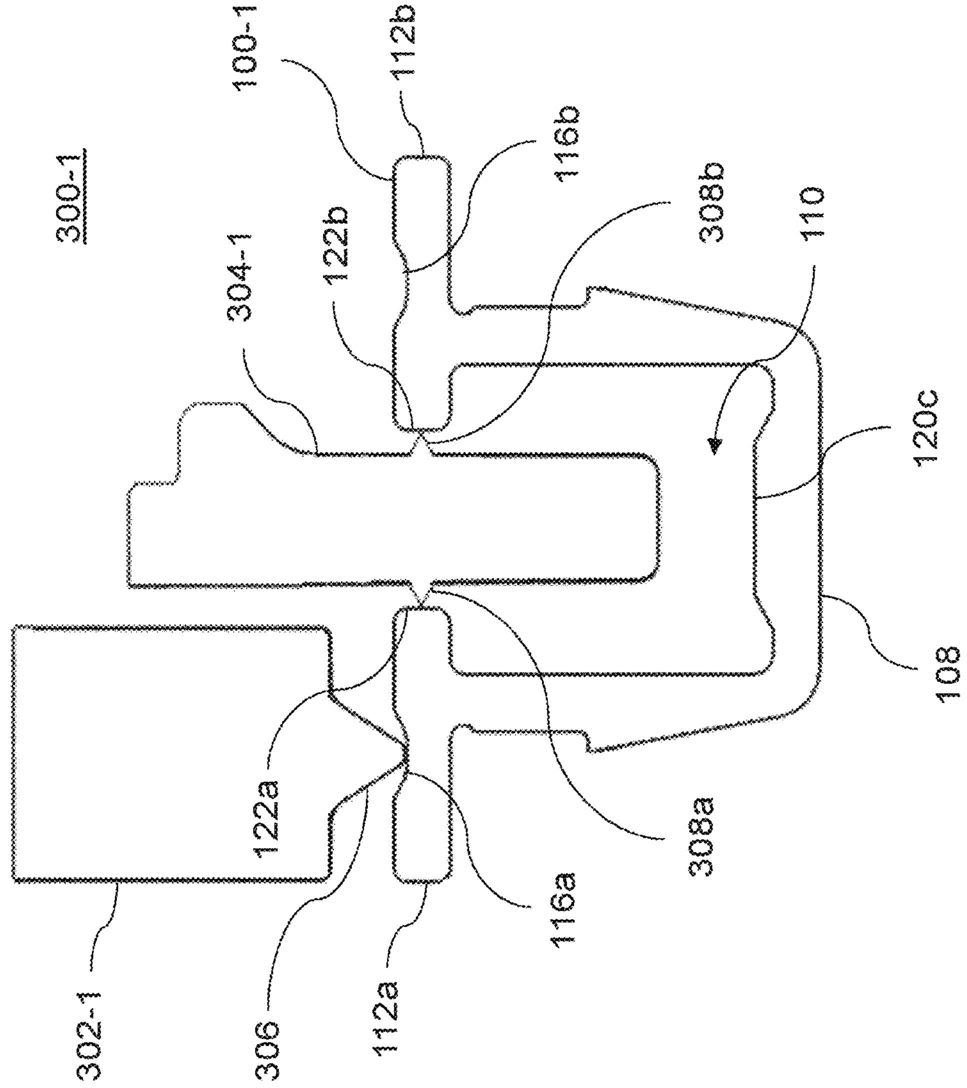
FIG. 4A shows a cross-sectional view of a first sliding arrangement comprising the slide rail of the first embodiment.

FIG. 4A shows a cross-sectional view of a sliding arrangement 300-1 according to a first embodiment. The sliding arrangement 300-1 may be main sliding arrangement 300-1 shown in FIG. 1. The sliding arrangement 300-1 comprises a slide rail 100-1, which may be identical to the slide rail 100 shown in FIGS. 2 and 3, or may have some minor differences, as discussed below. The sliding arrangement 300-1 also comprises a sliding member 302-1, and a guide component 304-1. The sliding arrangement 300-1 of FIG. 4A is generally intended for use at a lower portion of a sliding screen system, as will be explained in more detail in relation to FIGS. 6 and 8.

The sliding member 302-1 is configured to contact the slide surface 116*a* disposed on the first flange 112*a* of the slide rail 100-1. It will be appreciated that the sliding member 302-1 may equally be configured to contact the slide surface 116*b* disposed on the second flange 112*b* of the slide rail 100-1. Similarly, two sliding members 302-1 may be implemented and configured to contact respective slide surfaces 116*a*, 116*b* of the first and second flanges 112*a*, 112*b*. In this embodiment, no slide surface 116*c* is formed on the upper surface 120*c* of the third wall 108, although it will be appreciated that such a slide surface and a corresponding sliding member could be present.

The sliding member 302-1 is configured to slide along the slide surface 116*a* in a direction parallel to the longitudinal axis of the slide rail 100-1, i.e. perpendicular to the plane of FIG. 4A. This is the sliding direction A shown in FIG. 1. This motion may be caused by actuation of the sliding arrangement 300-1 and/or the sliding screen by a user. As discussed above, the slide surface 116*a* may be arranged as a recess in the first flange 112*a* and may extend along the slide rail 100-1.

The sliding member 302-1 and the guide component 304-1 may be coupled to a sliding screen, such as the sliding screen 400 of FIG. 1, as will be explained in relation to FIGS. 6 and 8. For example, the sliding member 302-1 may be provided with a fastening arrangement adapted for connection to a sliding screen to allow for movement of the sliding screen along the longitudinal axis of the slide rail 100-1.

The sliding member 302-1 may comprise at least one blade element 306, which is configured to provide contact with the slide surface 116*a*. The blade element 306 may extend in the sliding direction, that is to say in a direction parallel to the longitudinal axis of the slide rail 100-1, e.g. the sliding direction A shown in FIG. 1. It has been found that decreasing the contact area at the interface between the slide rail 100-1 and the sliding member 302-1, for example by configuring the part of the sliding member 302-1 arranged in contact with the slide surface 116*a* as a blade element 306, reduces the friction. According to an embodiment, the contact area of each individual contact point is less than 3 $mm^2$, such as less than 1.5 $mm^2$, or less than 0.75 $mm^2$. The sliding member 302-1 may further be provided with more than one contact point, such as two, three or four contact points. If the sliding member is configured as having one or more blade elements 306 extending in the sliding direction A, then the edge of each blade represents an individual contact point.

The sliding member 302-1 may be formed of plastic. In one embodiment, the sliding member 302-1 is formed of a polymer selected from the group of polymers consisting of polyoxymethylenes (POM), polymethyl methacrylate (PMMA), polycarbonate (PC), polypropylene (PP), polypropylene copolymers (PPCO), polyesters (e.g. thermoplastic polyesters, such as polyethylene terephthalate (PET), polytrimethylene terephthalate (PTT), polybutylene terephthalate (PBT), and polylactic acid (PLA), as well as bio-based thermoplastic polyesters, as such polyhydroxyalkanoates (PHA), polyhydroxybutyrate (PHB), and polyethylene furanoate (PEF)), polyamides (PA), such as polyamide 6 (PA6), polyvinyl chloride (PVC), polyphenylene sulfide (PPS), polyaryletherketone (PAEK; e.g. Polyether ether ketone (PEEK)), and Polytetrafluoroethylene (PTFE). In some embodiments, the sliding member 302-1 may be formed by injection molding.

In some embodiments, the sliding member 302-1 may be formed of a different plastic from the slide rail 100-1. That is to say, the slide rail 100-1 is formed of a first plastic and the sliding member 302-1 is formed of a second plastic. In some embodiments, only the blade element 306 of the sliding member 302-1 is formed of the second plastic. In other embodiments, the entire sliding member 302-1 is formed of the second plastic.

The first and second plastics may be different grades of plastics (e.g. PET with different intrinsic viscosity), plastics of different sub-types of plastics (e.g. PA 6 and PA 66, or PET and PBT), or preferably different types of plastics (e.g. polyacetal and polyamide), i.e. plastics comprising different types of polymers. The first plastic may comprise a first type of polymer, e.g. a polyoxymethylene (POM), whereas the second plastic may comprise another type of polymer, e.g. a polyamide (PA), a polycarbonate (PC) or a polyester (PET). In different types of polymers, the linkage between the monomers typically differs (e.g. amide coupling and acetal coupling, respectively), and/or the functional groups attached to the polymer chain differ (e.g. amide group and methyl group, respectively). In one embodiment, the first plastic is PA, PC, PPCO, or PMMA and the second plastic is POM or PA. In another embodiment, the first plastic is POM or PA. In a preferred embodiment, one of the first and second plastics is POM and the other is PA, such as PA6, or PC. In a most preferred embodiment, the first plastic is PA, PC or PET and the second plastic is POM.

The guide component 304-1 is arranged adjacent to and spaced from the sliding member 302. The guide component 304-1 is arranged to be received in the open channel 110 of the slide rail 100-1. The guide component 304-1 is configured to slide along the channel 110 in a direction parallel to the longitudinal axis of the slide rail 100-1, e.g. the sliding direction A shown in FIG. 1. This motion may be caused by actuation of the sliding arrangement 300-1 and/or the sliding screen by a user. As discussed above, the guide component 304-1 serves to maintain the sliding screen in position as it moves along the length of the slide rail 100, and ensure that a good contact is formed between the sliding member 302-1 and the relevant sliding surface 116*a*. In some embodiments, the guide component 304-1 may be formed of a plastic such as POM.

As shown in FIG. 4A, the guide component 304-1 comprises blade elements 308*a*, 308*b*. The blade elements 308*a*, 308*b* may extend in the sliding direction A and may be configured to interface with the inner surfaces 122*a*, 122*b* of the flanges 112*a*, 112*b*. In other embodiments, the blade elements 308*a*, 308*b* may extend perpendicular to the sliding direction A in order to increase the potential area of contact between the blade elements 308*a*, 308*b* and the inner surfaces 122*a*, 122*b* of the flanges 112*a*, 112*b*. In some embodiments, the inner surfaces 122*a*, 122*b* may each comprise a groove configured to receive a respective blade element 308*a*, 308*b*. This provides improved contact between the guide component 304-1 and the slide rail 100-1 along the length of the slide rail 100-1, such that the sliding screen is maintained in position as it moves along the length of the slide rail 100-1 and a good contact is formed between the sliding member 302 and the sliding surface 116*a*.

Figure 4B:
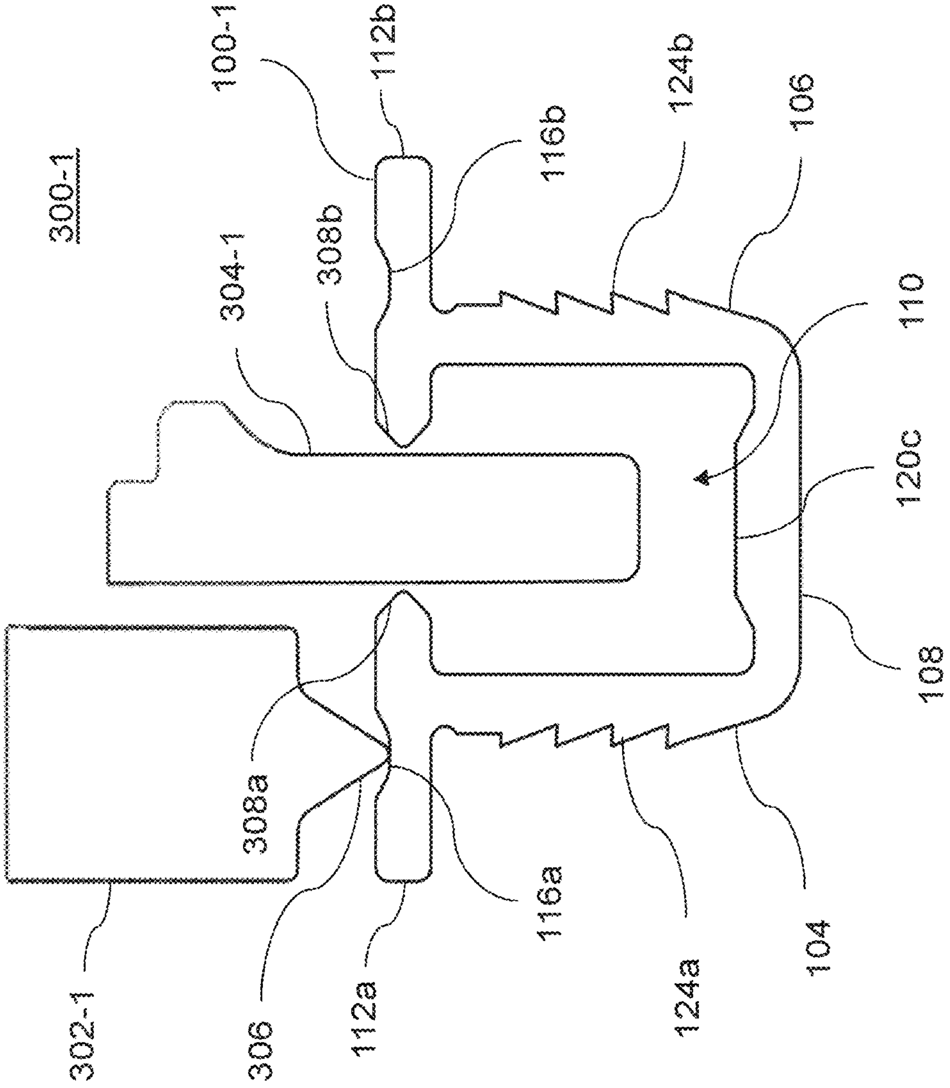
FIG. 4B shows a cross-sectional view of the first sliding arrangement comprising an alternative slide rail.

FIG. 4B shows a cross-sectional view of a sliding arrangement 300-1 substantially similar to the first embodiment shown in FIG. 4A, except that the blade elements 308*a*, 308*b* are disposed on the inner surfaces 122*a*, 122*b* (not shown) of the flanges 112*a*, 112*b*. In such embodiments, the guide component 304-1 may comprise grooves configured to receive respective blade elements 308*a*, 308*b*.

In this embodiment, the first and second walls 104, 106 each comprise a plurality of ridges 124*a*, 124*b* disposed on the outer surface of the respective wall and extending along the length of the slide rail 100-1. By providing a plurality of ridges 124*a*, 124*b*, the friction between the slide rail 100-1 and the board 200 when the slide rail 100-1 is installed is further increased.

Figure 5A:
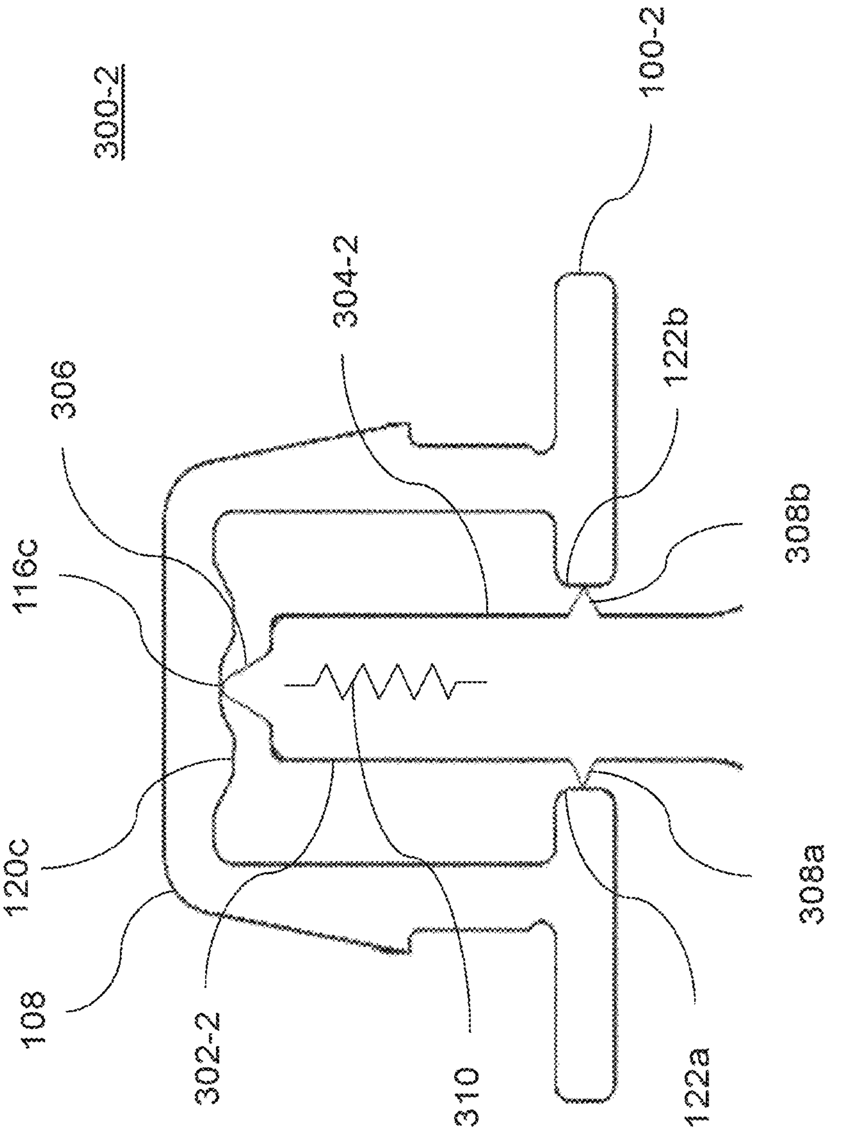
FIG. 5A shows a cross-sectional view of a second sliding arrangement comprising the slide rail of the first embodiment.
Figure 5B:
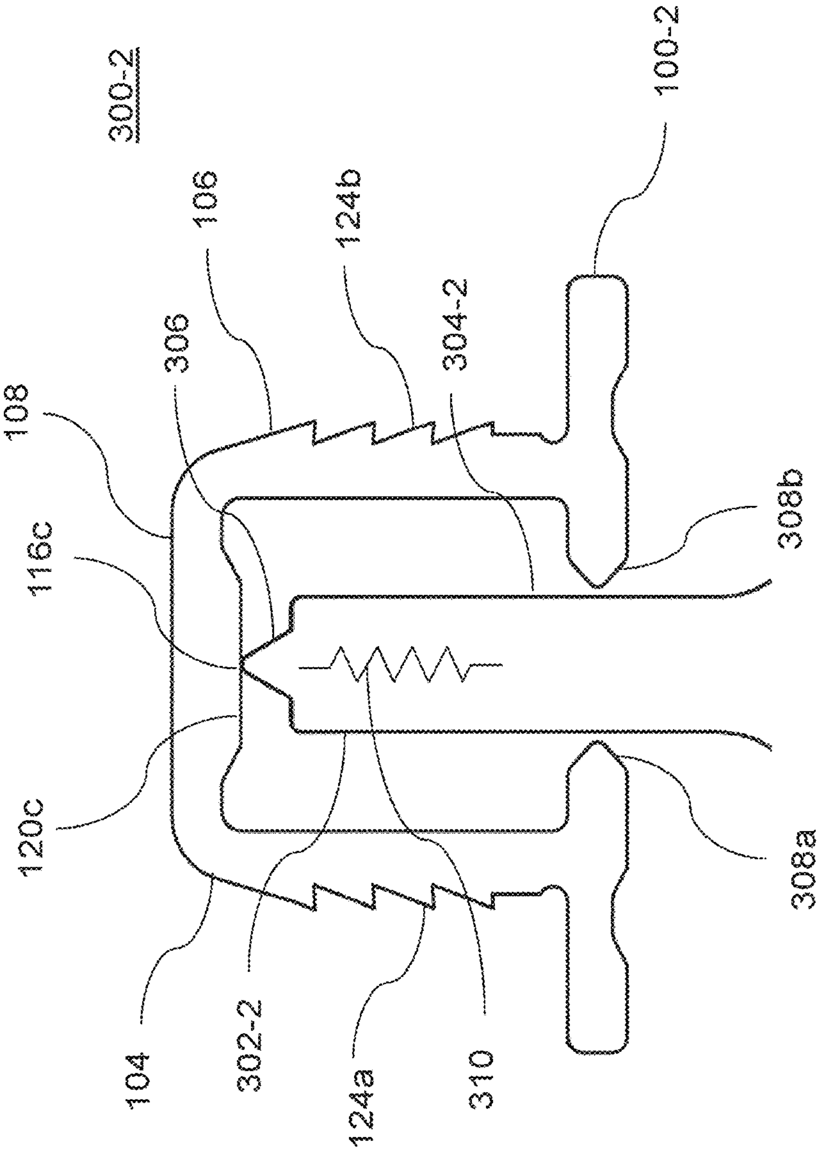
FIG. 5B shows a cross-sectional view of the second sliding arrangement comprising an alternative slide rail.

FIG. 5B shows a cross-sectional view of a sliding arrangement according to a second embodiment. The sliding arrangement 300-2 may be the auxiliary sliding arrangement 300-2 shown in FIG. 1. The sliding arrangement 300-2 comprises a slide rail 100-2, which may be identical to the slide rails 100, 100-1 shown in FIGS. 1 to 4, or may have some minor differences, as discussed below. The sliding arrangement 300-2 also comprises a sliding member 302-2, and a guide component 304-2. The sliding arrangement 300-2 of FIG. 5A is shown in the opposite sense to that of FIG. 4A. That is to say, the sliding arrangement 300-2 of FIG. 5A is shown upside down relative to that of FIG. 4A. This is because the sliding arrangement 300-2 of FIG. 5A is generally intended for use at an upper portion of a sliding screen system. This will be explained in more detail in relation to FIGS. 7 and 8.

In FIG. 5A, the sliding member 302-2 is configured to contact the slide surface 116*c* of the slide rail 100, disposed on the third wall 108 of the slide rail 100-2. The slide surface 116*c* is disposed on the lower surface 120*c* of the third wall 108, and may be arranged as a groove in the third wall 108 extending along the slide rail 100-2. In this embodiment, no slide surfaces 116*a*, 116*b* are formed on the surfaces 120*a*, 120*b* of the first and second flanges 112*a*, 112*b*, although it will be appreciated that such slide surfaces and corresponding slide members could be present.

In this embodiment, the sliding member 302-2 and the guide component 304-2 are coupled to each other or integrated into a single piece. For example, the sliding member 302-2 and the guide component 304-2 may be held together in a common housing, for example as part of a guide device. The sliding member 302-2 and the guide component 304-2 may be formed as a single structure, or as two separate but connected structures. The sliding member 302-2 and the guide component 304-2 are arranged in the channel 110 of the slide rail 100-2. The slide member 302-2 is configured to contact the slide surface 116*c* and slide along the slide surface 116*c* in a direction parallel to the longitudinal axis of the slide rail 100-2, i.e. perpendicular to the plane of FIG. 5A, e.g. the sliding direction A shown in FIG. 1. As such, the sliding member 302-2 and the guide component 304-2 are configured to slide along the channel 110 in a direction parallel to the longitudinal axis of the slide rail 100-2. As in the embodiment of FIG. 4A, the sliding member 302-2 may comprise at least one blade element 306, which is configured to provide contact with the slide surface 116*c*.

It has been found that the friction becomes lower when the contact pressure between a sliding member a slide rail is not too low. As such, the sliding member 302-2 of this embodiment may be configured to exert a spring force against the slide surface 116*c*. In particular, the sliding member 302-2 or the guide component 304-2 may comprise or be coupled to a resilient component 310, such as a spring illustrated schematically in FIG. 5A, that enables restricted movement of the sliding member 302-2 perpendicularly to the extension of the slide rail 100-2. As such, when the sliding member 302-2 is installed in the slide rail 100-2, contact between the sliding member 302-2 and the slide surface 116*c* may cause the resilient component 310 to be compressed. This causes the resilient component 310 to be loaded, and push the sliding member 302-2 against the slide surface 116*c*, meaning there is always contact between the sliding member 302-2 and the slide surface 116*c*, and that the sliding member 302-2 applies a certain load on the slide surface 116*c*, as caused by the spring 310. This acts to keep the sliding member 302-2 in position and increases the contact pressure between the sliding member 302-2 and the slide surface 116*c*, thus decreasing the friction and providing a low start resistance. This combination is hard to achieve with roll bearings and other bearings known in the art.

Similar to the embodiment shown in FIG. 4A, the guide component 304-2 comprises blade elements 308*a*, 308*b* that extend in the sliding direction A and are configured to interface with the inner surfaces 122*a*, 122*b* of the flanges 112*a*, 112*b*. In some embodiments, the blade elements 308*a*, 308*b* may extend perpendicular to the sliding direction A. In some embodiments, the inner surfaces 122*a*, 122*b* may each comprise a groove configured to receive a respective blade element 308*a*, 308*b*. This provides the associated advantages discussed above.

FIG. 5B shows a cross-sectional view of a sliding arrangement 300-1 substantially similar to the second embodiment shown in FIG. 5A, except that the blade elements 308*a*, 308*b* are disposed on the inner surfaces 122*a*, 122*b* (not shown) of the flanges 112*a*, 112*b* and the guide component 304-2 may comprise grooves configured to receive the respective blade elements 308*a*, 308*b*.

In this embodiment, the first and second walls 104, 106 each comprise a plurality of ridges 124*a*, 124*b* disposed on the outer surface of the respective wall and extending along the length of the slide rail 100-2. By providing a plurality of ridges 124*a*, 124*b*, the friction between the slide rail 100-2 and the board 200 when the slide rail 100-2 is installed is further increased.

Figure 6:
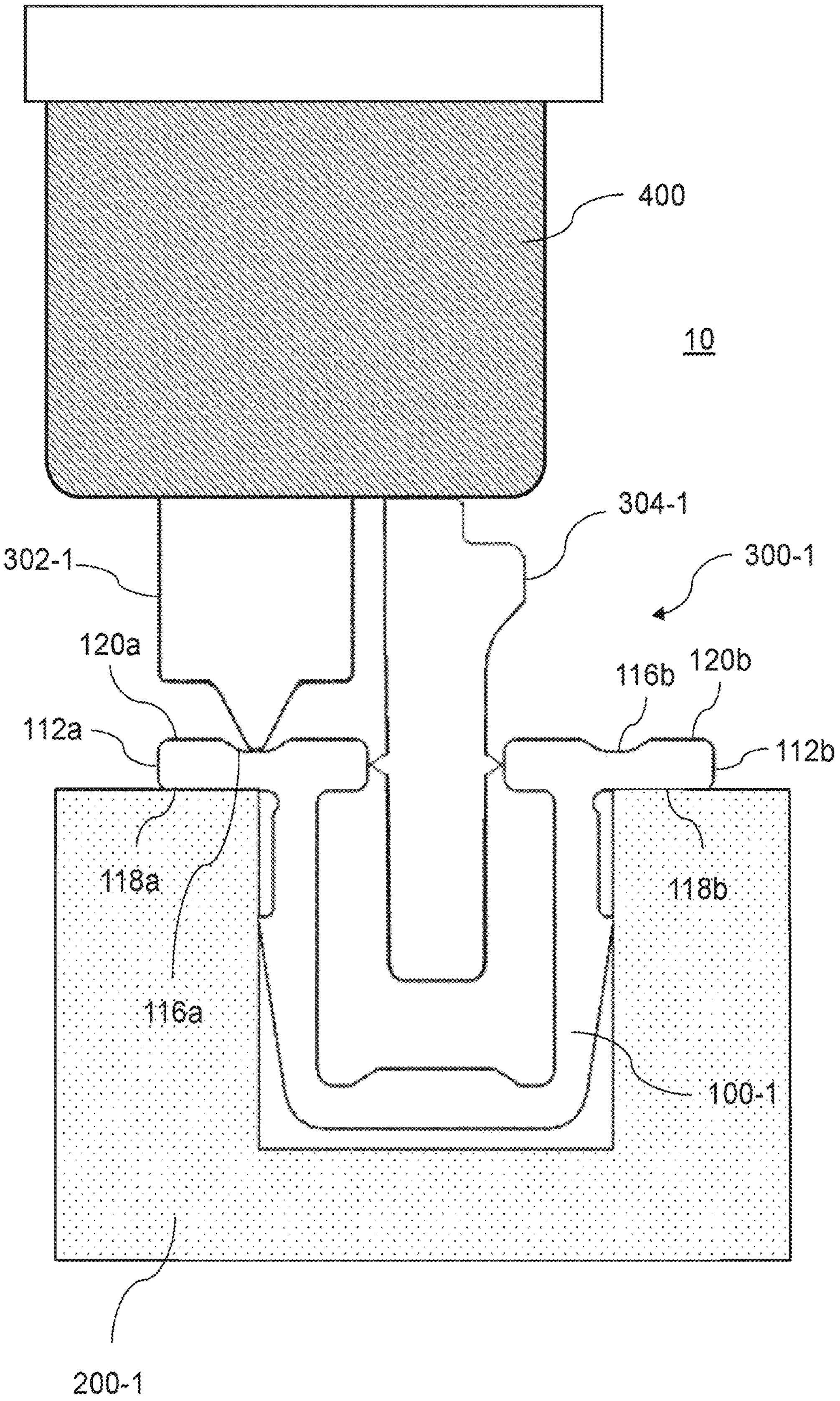
FIG. 6 shows a cross-sectional view of a lower end of the first sliding screen system comprising the first sliding arrangement of FIG. 4A.

FIG. 6 shows a cross-sectional view of a lower end of the first sliding screen system 10 comprising the first sliding arrangement 300-1 of FIG. 4A and a sliding screen 400. The slide rail 100-1 is installed in a lower board or base board 200-1. The slide rail 100-1 may be secured in the lower board 200-1 by a friction fit caused by inward compression of the first and second walls 104, 106 of the slide rail 100-1 upon installation.

The sliding screen 400 is arranged standing on the slide rail 100-1. In particular, the sliding screen 400 is connected to the sliding member 302-1 of the sliding arrangement 300-1. The sliding member 302-1 is in contact with the slide surface 116*a*. As discussed above, the sliding member 302-1 is configured to slide along the slide surface 116*a* in a direction parallel to the longitudinal axis of the first slide rail 100-1, i.e. perpendicular to the plane of FIG. 6, e.g. the sliding direction A shown in FIG. 1.

The guide component 304-1 is arranged in the channel 110 of the slide rail 100-1. The guide component 304-1 serves to maintain the sliding screen 400 in position as it moves along the length of the slide rail 100-1, and ensure a good contact is formed between the sliding member 302-1 and the slide surface 116*a*. When a guide component 304-1 is present, the sliding screen 400 may be connected to the guide component 304-1. The sliding member 302-1 and/or the guide component 304-1 may be provided with a fastening arrangement (not shown) adapted for connection to the sliding screen 400.

In the embodiment of FIG. 6, the slide rail 100-1 and the sliding arrangement 300-1 are arranged at a lower portion of the sliding screen system 10. The slide rail 100 is arranged so that the slide surfaces 116*a*, 116*b* face upwards. That is to say, the slide surfaces 116*a*, 116*b* are disposed on upper surfaces 120*a*, 120*b* of the first and second flanges 112*a*, 112*b* respectively.

As discussed above, the first and second flanges 112*a*, 112*b* are configured to bear a vertical load applied to the sliding screen system 10. To this end, the lower surfaces 118*a*, 118*b* of the first and second flanges 112*a*, 112*b* are configured to interface with the board 200-1.

Figure 7:
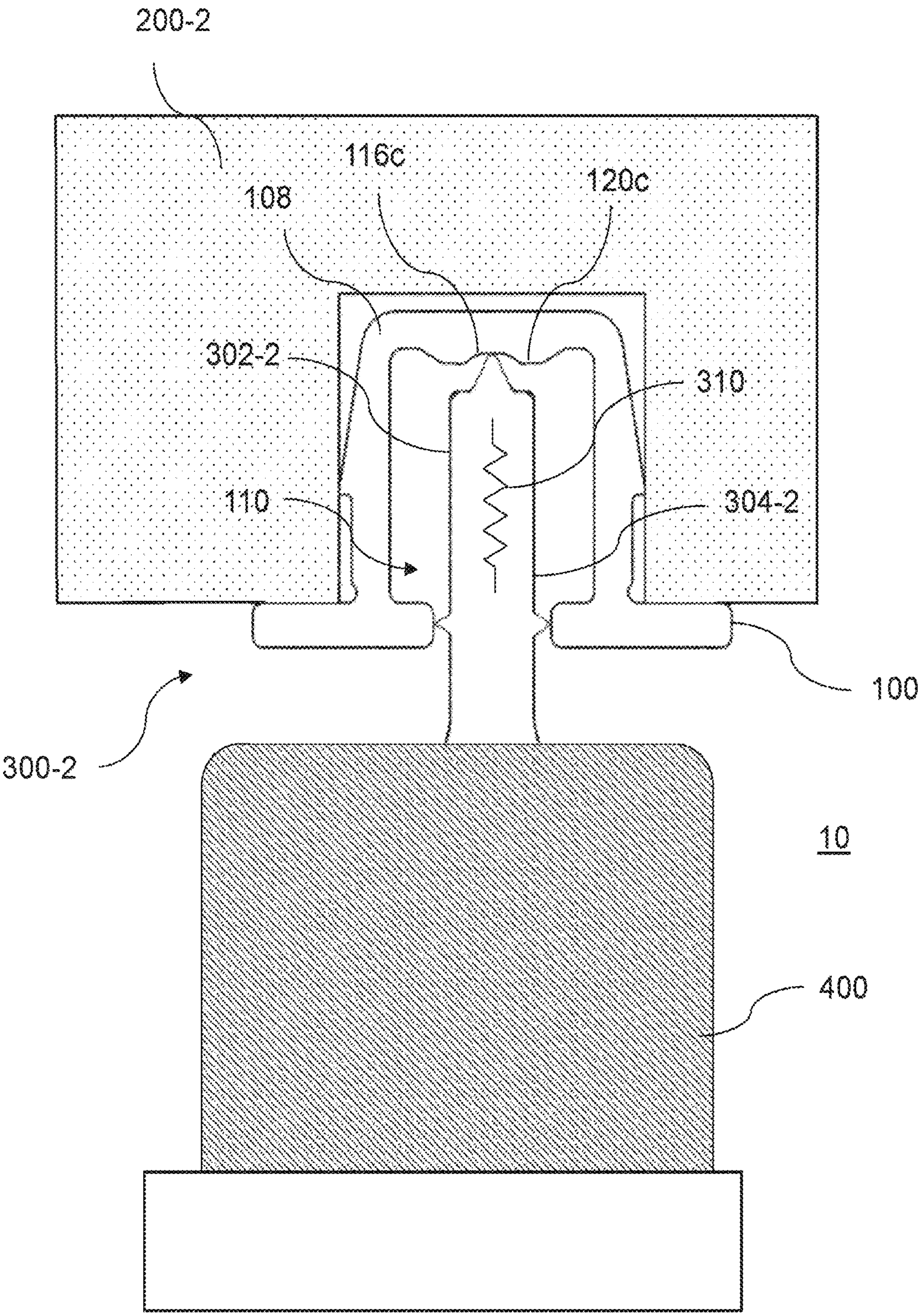
FIG. 7 shows a cross-sectional view of an upper end of the first sliding screen system comprising the second sliding arrangement of FIG. 5A.

FIG. 7 shows a cross-sectional view of an upper end of the first sliding screen system 10 comprising the sliding arrangement 300-2 of FIG. 5A and a sliding screen 400. The slide rail 100-2 is installed in an upper board 200-2 and is arranged in the opposite sense to the first slide rail 100-1, i.e. is upside down relative to the first slide rail 100-1. The slide rail 100-2 may be secured in the upper board 200-2 by a friction fit. The sliding screen 400 is connected to the sliding member 302-2 and the guide component 304-2 of the sliding arrangement 300-2, which, as discussed above, may be coupled to each other or integrated.

In the embodiment of FIG. 7, the slide rail 100-2 and the sliding arrangement 300-2 are arranged at an upper portion of the sliding screen system 10. The slide rail 100 is arranged so that the slide surface 116*c* faces downwards. That is to say, the slide surface 116*c* is disposed on the lower surface 120*c* of the third wall 108 that is adjacent to the channel 110.

The sliding member 302-2 is in contact with the slide surface 116*c* of the slide rail 100-2. As discussed above, the sliding member 302-2 is configured to slide along the slide surface 116*c* in a direction parallel to the longitudinal axis of the second slide rail 100-2, i.e. perpendicular to the plane of FIG. 7, e.g. the sliding direction A shown in FIG. 1.

As discussed above, the sliding member 302-2 and the guide component 304-2 may be coupled to each other or integrated. The sliding member 302-2 and the guide component 304-2 may be formed as a single structure, or as two separate but connected structures. The guide component 304-2 is arranged in the channel 110 of the slide rail 100-2, and the sliding member 302-2 is configured to contact the slide surface 116*c* and slide along the slide surface 116*c*. The sliding member 302-2 may comprise a resilient component 310 and be configured to exert a spring force against the slide surface 116*c*, as discussed above.

Figure 8:
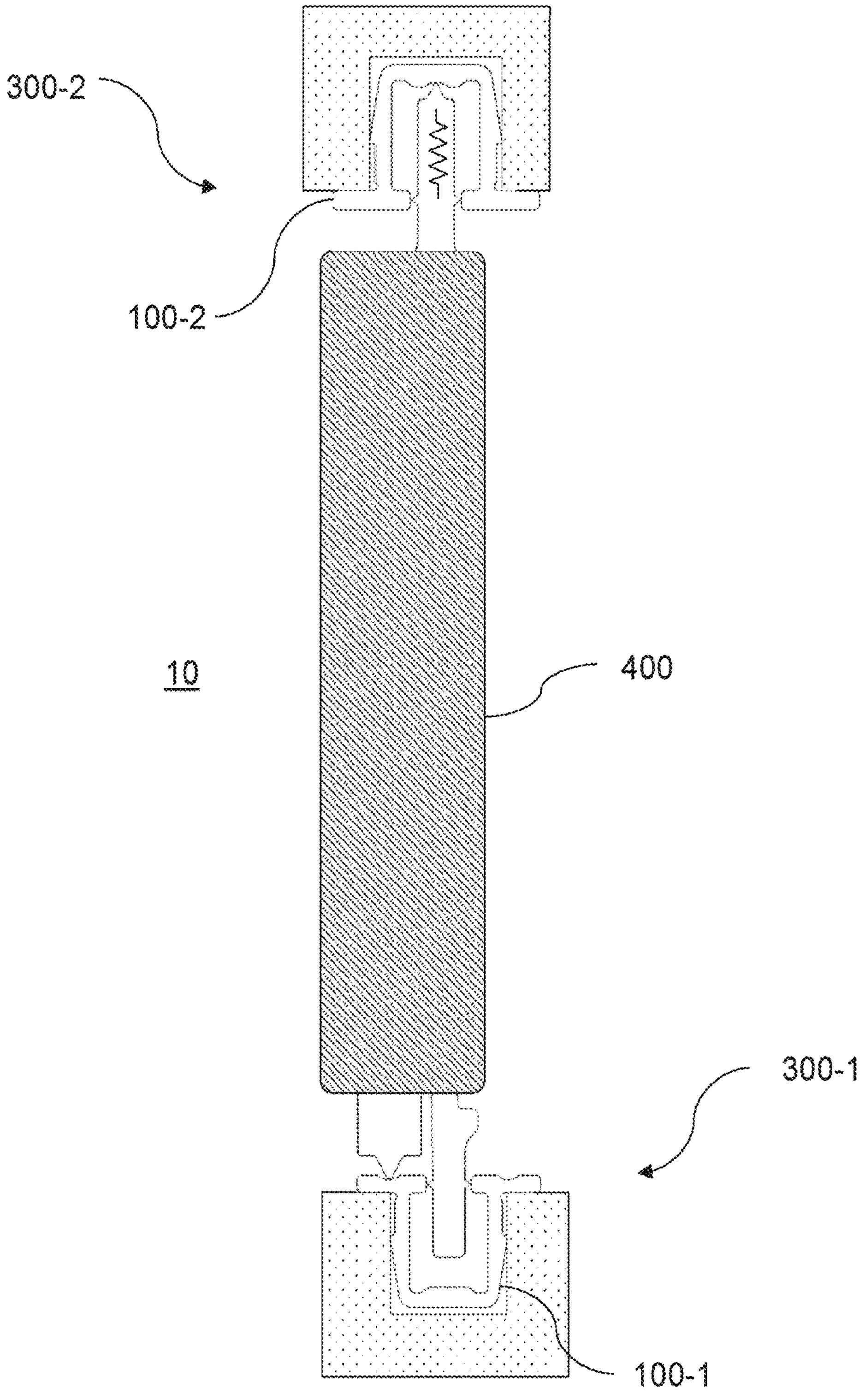
FIG. 8 shows a cross-sectional view of the first sliding screen system combining the first and second sliding arrangements.

FIG. 8 shows a cross-sectional view of the first sliding screen system 10 comprising the sliding arrangements 300-1, 300-2 arranged respectively at the bottom and top of the sliding screen 400, as shown in FIGS. 6 and 7.

Typically, the first slide rail 100-1 and the second slide rail 100-2 are horizontally aligned if the door is to be arranged vertically. However, the door may also be arranged in a tilted configuration where the first slide rail 100-1 and the second slide rail 100-2 are not aligned.

The sliding screen 400 is connected to the first and second sliding members 302-1, 302-2. In this way, when the sliding screen 400 is actuated, the sliding members 302-1, 302-2 slide along the slide rails 100-1, 100-2 in a direction parallel to the longitudinal axes of the slide rails 100-1, 100-2, i.e. in the sliding direction A.

Figure 9:
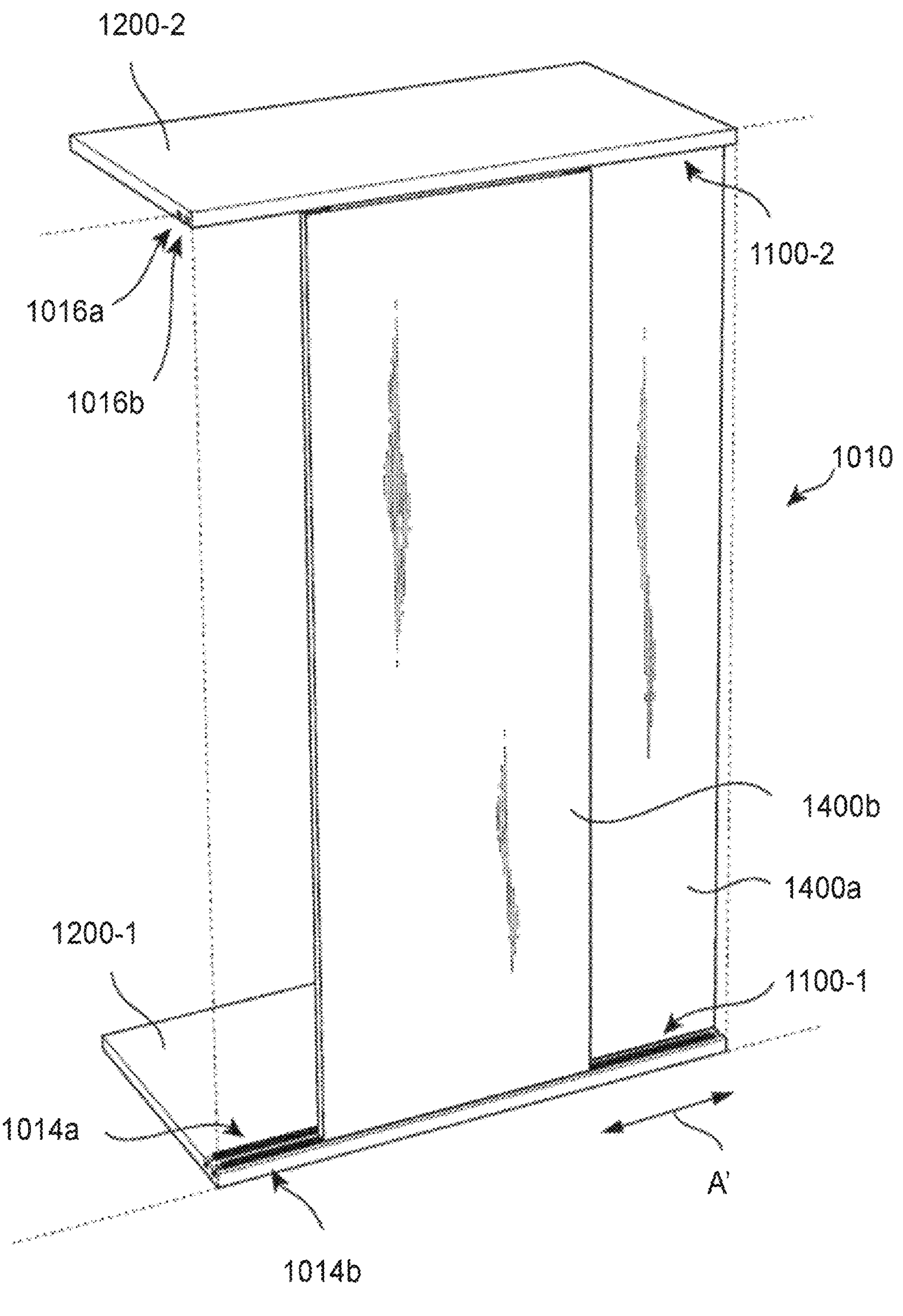
FIG. 9 shows a perspective view of a second sliding screen system.

FIG. 9 shows a perspective view of a second sliding screen system 1010. The sliding screen system 1010 is similar to the sliding screen system 10 shown in FIG. 1, except that it comprises two sliding screens 1400*a*, 1400*b*, first and second main sliding arrangements 1014*a*, 1014*b*, and first and second auxiliary sliding arrangements 1016*a*, 1016*b*. The first sliding screen 1400*a* and second sliding screen 1400*b* are arranged adjacent to each another and in parallel with each other. Each one of the main sliding arrangements 1014 and the auxiliary sliding arrangements 1016 are provided by a dual slide rail 1100, as will be explained below.

The first and second main sliding arrangements 1014 are arranged at a lower end of the sliding screen system 1010 and adapted to carry a weight of the sliding screens 1400. Specifically, the first main sliding arrangement 1014*a* is adapted to carry the weight of the first sliding screen 1400*a* and the second main sliding arrangement 1014*b* is adapted to carry the weight of the second sliding screen 1400*b*.

The first and second auxiliary sliding arrangements 1016 are arranged at an upper end of the sliding screen system 1010 and are adapted for steering the sliding screens 1400 during a sliding movement defined by the main sliding arrangements 1014. Specifically, the first auxiliary sliding arrangement 1016*a* is adapted for steering the first sliding screen 1400*a* and the second auxiliary sliding arrangement 1016*b* is adapted for steering the second sliding screen 1400*b*.

A first dual slide rail 1100-1 is adapted to provide the first and second main sliding arrangements 1014, as will be explained in relation to FIGS. 10 to 12. The first dual slide rail 1100-1 is adapted for being rigidly connected to a lower platform 1200-1 in a recessed configuration, so that the sliding screens 1400 may be moved relative to the lower platform 1200-1. The first dual slide rail 1100-1 is adapted to carry the weight of the sliding screens 1400.

A second dual slide rail 1100-2 is adapted to provide the first and second auxiliary sliding arrangements 1016. The second dual slide rail 1100-2 is adapted for being rigidly connected to an upper platform 1200-2 in a recessed configuration, so that the sliding screens 1400 may be moved relative to the upper platform 1200-2. The sliding screens 1400 are configured to slide along the slide rails 1100 in a sliding direction A' relative to the platforms 1200.

Each one of the lower platform 1200-1 and the upper platform 1200-2 forms a part of a piece of furniture, in this case a lower panel and an upper panel of a wardrobe. The sliding screen system 1010 may alternatively be arranged in a cabinet, cupboard, sideboard or chest of drawers or for a sliding door that is slidable in relation to a structure, such as a wall/floor/ceiling in a building.

Figure 10:
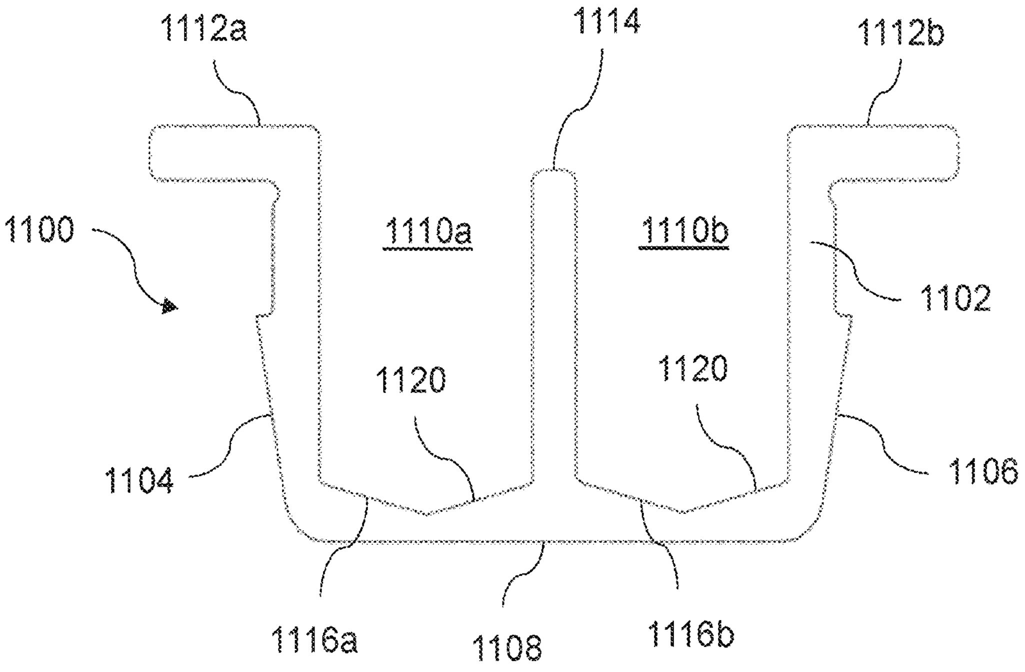
FIG. 10 shows a cross-sectional view of a slide rail according to a second embodiment.

FIG. 10 shows a cross-sectional view of a slide rail 1100 for a sliding arrangement according to a second embodiment. The slide rail 1100 may be the slide rail 1100-1 or the slide rail 1100-2 shown in FIG. 9. Similarly to the slide rail 100 of the first embodiment, the slide rail 1100 comprises an elongate bar body 1102 having a plurality of walls. The slide rail 1100 may be substantially linear, to allow for linear movement of a sliding member along the longitudinal axis of the slide rail 1100. In other embodiments, the slide rail 1100 may have a generally curved form along its longitudinal axis, in order to allow movement along a smooth curve.

In this case, the slide rail 1100 comprises a first wall 1104, a second wall 1106, a third wall 1108 and a fourth wall 1114 forming two open channels 1110*a*, 1110*b* extending along a longitudinal axis of the slide rail 1100. The open channels 1110*a*, 1110*b* are configured to receive a sliding member of a sliding arrangement, as will be explained in relation to FIG. 12. As with the slide rail 100, the first wall 1104 is arranged opposite the second wall 1106, and the third wall 1108 is arranged between them and connecting them. The fourth wall 1114 is extends from the third wall 1108 between the first and second walls 1104, 1106 and in a direction parallel to the first and second walls 1104, 1106, e.g. the sliding direction A' shown in FIG. 9. This forms two open channels: a first open channel 1110*a* between the first wall 1104 and the fourth wall 1114, and a second open channel 1110*b* between the fourth wall 1114 and the second wall 1106. The third wall 1108 forms the bottom of both channels 1110*a*, 1110*b*.

In the embodiment of FIG. 10, the first, second and fourth walls 1104, 1106, 1114 are arranged parallel to each other, and the third wall 1108 is arranged perpendicular to the first, second and fourth walls 1104, 1106, 1114. However, it will be envisaged that the plurality of walls could be formed with different relative angles that still form two open channels 1110*a*, 1110*b* in the elongate bar body 1102. For example, either of the first and second walls 1104, 1106 could slope inwardly or outwardly from the third wall 1108, either symmetrically or asymmetrically. In one example, more than four walls could be present. For example, intermediate walls could connect each of the first and second walls 1104, 1106 to the third wall 1108. Different cross-sections of the slide rail 1100 are therefore readily envisaged by the skilled person.

Similarly to the slide rail 100, the slide rail 1100 further comprises at least one flange 1112*a*, 1112*b*. In FIG. 10, two flanges 1112*a*, 1112*b* are shown connected to the first and second walls 1104, 1106 respectively. The flanges 1112*a*, 1112*b* extend substantially away from each open channel 1110*a*, 1110*b* from a side of the elongate bar body 1102. That is to say, the flanges 1112*a*, 1112*b* extend outwardly from the elongate bar body 1102. Specifically, the first flange 1112*a* extends away from the first open channel 1110 from the first wall 1104, and the second flange 1112*b* extends away from the second open channel 1110*b* from the second wall 1106 of the elongate bar body 1102 in a direction opposite and parallel to the extension of the first flange 1112*a*. As will be explained in relation to FIG. 12, the flanges 1112*a*, 1112*b* are parallel to the top surface of a board 1200 into which the slide rail 1100 is installed.

In the embodiment shown in FIG. 10, where the walls 1104, 1106, 1108, 1114 are arranged orthogonally (i.e. at right angles to each other), the extension of the flanges 1112*a*, 1112*b* is substantially in a plane perpendicular to the first, second and fourth walls 1104, 1106, 1114 and parallel to the third wall 1108. As discussed above, in some embodiments, the first, second and fourth walls 1104, 1106, 1114 may not be perpendicular to the third wall 1108. In these embodiments, the arrangement of the flanges 1112*a*, 1112*b* is dependent on the positioning of the slide rail 1100 when it is inserted into a board. For example, if the third wall 1108 is not arranged horizontally, the flanges 1112*a*, 1112*b* may extend substantially in a plane perpendicular to the first and second walls 1104, 1106, but not parallel to the third wall 1108. Similarly, if the first and second walls 1104, 1106 are not arranged vertically, the flanges 1112*a*, 1112*b* may extend substantially in a plane parallel to the third wall 1108, but not perpendicular to the first and second walls 1104, 1106.

The slide rail 1100 further comprises at least one slide surface 1116*a*, 1116*b* extending parallel to the longitudinal axis of the slide rail 1100 and along the length of the slide rail 1100. The slide surfaces 1116*a*, 1116*b* are formed on a top surface 1120 of the third wall 1108 and are configured to receive a sliding member of a sliding arrangement, as will be explained in relation to FIGS. 11 and 12. The sliding member may be coupled to a sliding screen, as will be explained in relation to FIG. 12. The slide surfaces 1116*a*, 1116*b* are formed as grooves in the slide rail 1100. In this embodiment, the slide surfaces 1116*a*, 1116*b* are formed as shallow V-shapes, which further improves the control of the lateral position of the sliding member in relation to the slide rail 1100 when the sliding member slides along the slide rail 1100. In other embodiments, the slide surfaces 1116*a*, 1116*b* may be formed as U-shapes. In other embodiments, the slide surfaces 1116*a*, 1116*b* may be formed as flat surfaces comprising a groove, as discussed in relation to the slide surfaces 116*a-c*. In FIG. 10, two slide surfaces 1116*a*, 1116*b* are shown at the bottom of each channel 1110*a*, 1110*b*. However, it will be appreciated that, alternatively, only a single slide surface may be present in either the first channel 1110*a* or the second channel 1110*b*. Further slide surfaces may also be formed corresponding to each of the first and second flanges 1112*a*, 1112*b*. The slide surfaces 1116*a*, 1116*b* may be at least partly coated with a lipophilic composition coating to provide a slide layer with lowered friction, as discussed in relation to the slide rail 100.

In some embodiments, the slide rail 1100 is formed of plastic, such as one of the plastics discussed in relation to the slide rail 100. In some embodiments, the slide rail 1100 is formed by extrusion molding or injection molding. In other embodiments, the slide rail 1100 may be formed of metal, such as aluminium or steel. In these embodiments, the at least one slide surface 1116*a*, 1116*b* may be coated with a lacquer comprising a resin, for example an acrylic resin, with a lipophilic composition, such as those discussed above.

Figure 11:
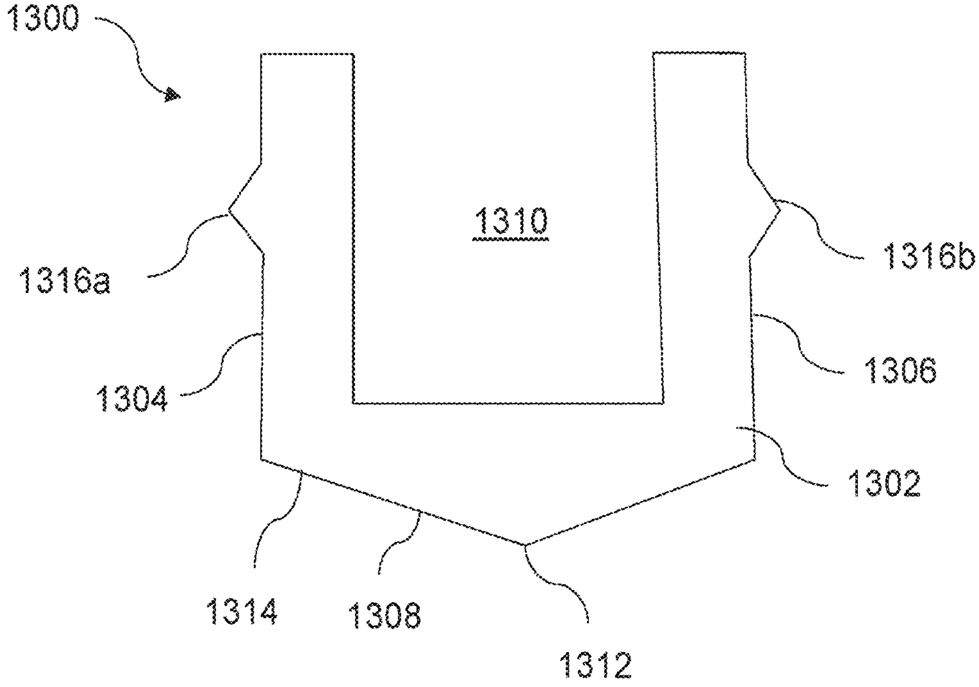
FIG. 11 shows a cross-sectional view of a sliding member for the second sliding screen system.

FIG. 11 shows a cross-sectional view of a sliding member 1300 for use with the slide rail 1100. The sliding member 1300 comprises an elongate bar body 1302 having a plurality of walls 1304, 1306, 1308 forming an open channel 1310 extending along a longitudinal axis of the sliding member 1300. The open channel 1310 is configured to receive a sliding screen, as will be explained in relation to FIG. 12. The sliding member 1300, when inserted in the slide rail 1100, may provide a sliding arrangement such as one of the main sliding arrangements 1014 or auxiliary sliding arrangements 1016.

In FIG. 11, the elongate bar body 1302 is shown having three walls forming a generally U-shaped body. Specifically, a first wall 1304 is arranged opposite a second wall 1306, these two walls forming the sides of the U-shape, and a third wall 1308 is arranged between the first and second walls 1304, 1306, this third wall 1308 forming the bottom of the U-shape. As will be explained in relation to FIG. 12, the elongate bar body 1302 has a profile configured to match that of a slide rail 1100 into which the sliding member 1300 is to be inserted.

In the embodiment of FIG. 11, the first and second walls 1304, 1306 are arranged parallel to each other, and the third wall 1308 is arranged perpendicular to the first and second walls 1304, 1306. However, it will be envisaged that the walls 1304, 1306, 1308 could be formed with different relative angles that still form an open channel 1310 in the elongate bar body 1302. For example, the first and second walls 1304, 1306 could slope inwardly or outwardly from the third wall 1308, either symmetrically or asymmetrically. In one example, more than three walls could be present. For example, intermediate walls could connect each of the first and second walls 1304, 1306 to the third wall 1308. Different cross-sections of the slide rail 100 are therefore readily envisaged by the skilled person.

The sliding member 1300 further comprises at least one contact portion 1312 extending parallel to the longitudinal axis of the slide rail 1300. The contact portion 1312 is formed on a lower surface 1314 of the third wall 1308 of the sliding member 1300. The contact portion 1312 is configured to interface with a corresponding slide surface 1116*a*, 1116*b* of a slide rail 1100, as will be explained in relation to FIG. 12. In particular, the contact portion 1312 is configured to provide an edge or blade contact (which appears as a point contact in the illustrated cross section) with a corresponding slide surface 1116*a*, 1116*b* of a slide rail 1100. The lower surface 1314 may be formed as a shallow V-shape or U-shape such that the sliding member 1300 fits in one of the open channels 1110*a*, 1110*b* of the slide rail 1100. In particular, the lower surface 1314 has a steeper shape than the slide surfaces 1116*a*, 1116*b* of the slide rail 1100. In other embodiments, the lower surface 1314 could have any shape that allows the contact portion 1312 to form an edge or blade contact with the slide surface 11116*a*, 1116*b* and allow the sliding member 1300 to move freely in the open channel 1110*a*, 1110*b* in a longitudinal direction.

The first and second walls 1304, 1306 of the sliding member 1300 may each further comprise a blade element 1316*a*, 1316*b* disposed on the outer surface of the respective wall and extending along the length of the sliding member 1300. The blade elements 1316*a*, 1316*b* are configured to engage a corresponding surface of an open channel 1110*a*, 1110*b* of the slide rail 1100, as will be explained in relation to FIG. 12.

The sliding member 1300 may be formed of plastic, similar to the slide members 302 discussed above. In some embodiments, the sliding member 1300 may be formed of a different plastic from the slide rail 1100. That is to say, the slide rail 1100 is formed of a first plastic and the sliding member 1300 is formed of a second plastic. The sliding member 1300 may comprise one or more stops (not shown) disposed in the open channel 1310, configured to resist longitudinal movement of a sliding screen installed in the sliding member.

Figure 12:
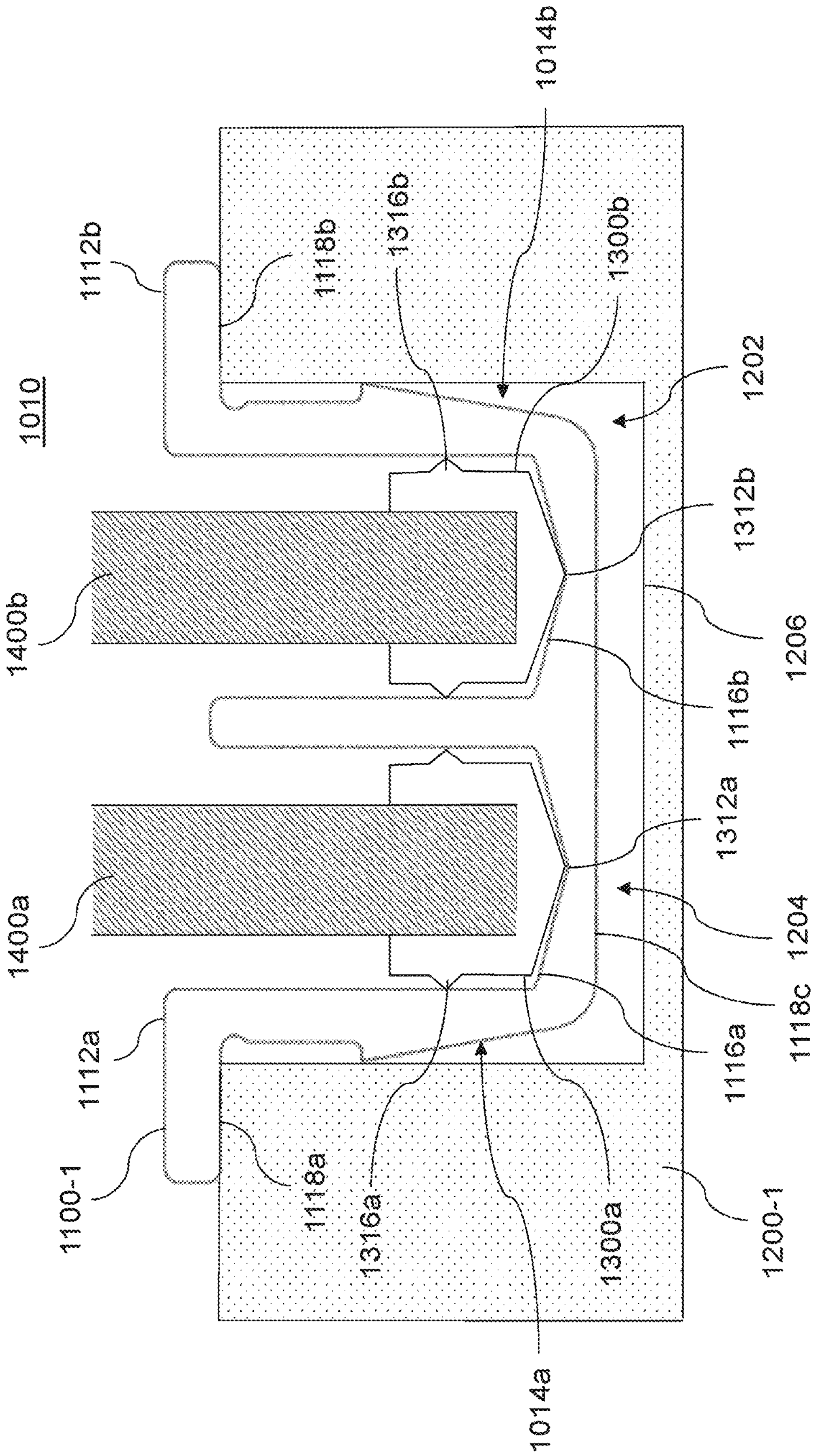
FIG. 12 shows a cross-sectional view of the second sliding screen system.

FIG. 12 shows a cross-sectional view of a lower part of the second sliding screen system 1010. In the second sliding screen system 1010, the slide rail 1100-1 is installed in the lower board 1200-1, which may be fibre board, e.g. MDF or HDF, or particle board (also known as chipboard). As can be seen in FIG. 12, the slide rail 1100-1 is inserted in a recess 1202 of the board 1200-1.

When installed in the board 1200-1, the flanges 1112*a*, 1112*b* are configured to support a vertical load applied to the slide rail 1100-1. In some embodiments, a support surface 1118, 1118*b* of each flange 1112*a*, 1112*b* is configured to interface with the board 1200-1 to support the vertical load. In these embodiments, a bottom surface 1118*c* of the third wall 1108 may not interface with the board 1200-1, thereby forming a gap 1204 between the bottom surface 1118*c* and the bottom 1206 of the recess 1202. This provides a tolerance for the depth of the recess 1202 and insertion of the slide rail 1100-1 into the recess 1202 of the board 1200-1. In this way, the recess 1202 can be made sufficiently deep to ensure that contact between the slide rail 1100-1 and the board 1200-1 is made at the support surfaces 1118*a*, 1118*b*.

Also shown in FIG. 12 are two sliding members 1300*a*, 1300*b* coupled to respective sliding screens 1400*a*, 1400*b*. The sliding members 1300*a*, 1300*b* are disposed in respective open channels 1110*a*, 1110*b* of the slide rail 1100-1 to provide the first and second main sliding arrangements 1014*a*, 1014*b*. The contact portions 1312*a*, 1312*b* of the sliding members 1300*a*, 1300*b* interface with corresponding slide surfaces 1116*a*, 1116*b* of the slide rail 1100-1. Furthermore, the blade elements 1316*a*, 1316*b* of the sliding members 1300*a*, 1300*b* interface with corresponding surfaces of the open channels 1110*a*, 1110*b* of the slide rail 1100-1. As such, the sliding screens 1400 are maintained in position as they move along the length of the slide rail 1100-1, and it is ensured that a good edge or blade contact is formed between the contact portions 1312*a*, 1312*b* of the sliding members 1300*a*, 1300*b* and the slide surfaces 1116*a*, 1116*b* of the slide rail 1100-1.

When the sliding screens 1400*a*, 1400*b* are actuated, the sliding members 1300*a*, 1300*b* slide along the slide surfaces 1116*a*, 1116*c* in a direction parallel to the longitudinal axes of the slide rail 1100-1, i.e. in the sliding direction A'. This provides a sliding arrangement for thin and/or multi-part screens.

It will be appreciated that a similar arrangement could be provided at the top end of the sliding screen system 1010, with the slide rail 1100-2 installed in the upper board 1200-2. Alternatively, the sliding members 1300*a*, 1300*b* may comprise a resilient element as discussed in relation to FIGS. 5A and 5B. In some embodiments, the resilient element may act in a vertical sense and/or in a lateral sense to ensure contact between the sliding members 1300*a*, 1300*b* and the slide rail 1100-2. Alternatively, the slide rail 1100-2 may only provide lateral support for the sliding members 1300*a*, 1300*b* at the top end of the sliding screen system 1010. In some embodiments, the sliding members at the top end of the sliding screen system 1010 could be similar to that shown in FIGS. 5A and 5B, with or without the resilient element.

Also disclosed are examples according to the following clauses:

1. A slide rail (100, 1100) for a sliding screen system (10, 1010), the slide rail (100, 1100) comprising:
   an elongate bar body (102, 1102) for insertion in a recess of a board (200, 1200), the elongate bar body (102, 1102) comprising a plurality of walls forming at least one open channel (110, 1110*a-b*) extending along a longitudinal axis of the slide rail (100, 1100), wherein the plurality of walls comprises a first wall (104, 1104) and a second wall (106, 1106) arranged opposite to each other and a third wall (108, 1108) arranged between and connected to the first and second walls (104, 106, 1104, 1106);
   at least one flange (112*a-b*, 1112*a-b*) extending away from the at least one open channel (110, 1110*a-b*) from a side of the elongate bar body (102, 1102); and
   at least one slide surface (116*a-c*, 1116*a-b*) extending in parallel to the longitudinal axis of the slide rail (100, 1100), the slide surface (116*a-c*, 1116*a-b*) being configured to receive a sliding member (302, 1300) of a sliding arrangement (300, 1014*a-b*, 1016*a-b*) of the sliding screen system.
2. The slide rail of clause 1, wherein the slide surface (116*a-c*, 1116*a-b*) is formed as a groove in the slide rail (100, 1100) extending along the slide rail (100, 1100).
3. The slide rail (100, 1100) of clause 1 or 2, wherein a slide surface (116*c*, 1116*a-b*) is disposed on a surface (120*c*, 1120) of the third wall (108, 1108) of the elongate bar body (102) adjacent to the channel (110, 1110*a-b*).
4. The slide rail (100, 1100) of any preceding clause, wherein the at least one flange (112*a-b*, 1112*a-b*) extends away from the at least one open channel (110, 1110*a-b*) from a side of the elongate bar body (102, 1102) in a plane parallel to the third wall (108, 1108) and/or in a plane perpendicular to the first and/or second wall (104, 106, 1104, 1106).
5. The slide rail (100-1, 1100-1) of any preceding clause, wherein the at least one flange (112*a-b*, 1112*a-b*) is configured to support a vertical load applied to the slide rail (100-1, 1100-1), preferably wherein a support surface (118*a-b*, 1118*a-b*) of the at least one flange (112-*b*, 1112*a-b*) facing in a direction towards the third wall (108, 1108) of the elongate bar body (102, 1102) is configured to interface with the board (200-1, 1200-1) to support the vertical load.
6. The slide rail (100, 1100) of any preceding clause, wherein the at least one flange (112*a-b*, 1112*a-b*) comprises:
   a first flange (112*a*, 1112*a*) extending away from the first wall (104, 1104) of the elongate bar body (102, 1102); and
   a second flange (112*b*, 1112*b*) extending away from the second wall (106, 1106) of the elongate bar body (102, 1102) in a direction opposite to the extension of the first flange (112*a*, 1112*b*).
7. The slide rail (100, 1100) of any preceding clause, wherein the first and second walls (104, 106, 1104, 1106) are arranged parallel to each other and the third wall (108, 1108) is arranged perpendicular to the first and second walls (104, 106, 1104, 1106).
8. The slide rail (100, 1100) of any preceding clause, wherein the slide rail (100) is formed of plastic, preferably a plastic comprising a polymer selected from the group of polymers consisting of polyoxymethylenes (POM), polymethyl methacrylate (PMMA), polycarbonate (PC), polypropylene (PP), polypropylene copolymers (PPCO), polyesters (e.g. thermoplastic polyesters, such as polyethylene terephthalate (PET)), polytrimethylene terephthalate (PTT), polybutylene terephthalate (PBT), and polylactic acid (PLA), as well as bio-based thermoplastic polyesters, such as polyhydroxyalkanoates (PHA), polyhydroxybutyrate (PHB), and polyethylene furanoate (PEF)), polyamides (PA), such as polyamide 6 (PA6), polyvinyl chloride (PVC), polyphenylene sulfide (PPS), polyaryletherketone (PAEK; e.g. Polyether ether ketone (PEEK)), and Polytetrafluoroethylene (PTFE), more preferably said plastic comprising a polymer selected from the group of polymers consisting of PA, PC, PPCO, polyester, and PMMA, and/or wherein the slide rail (100, 1100) is formed by extrusion molding.
9. The slide rail (100, 1100) of any of clauses 1 to 7, wherein the slide rail (100, 1100) is formed of metal, preferably wherein the at least one slide surface (116*a-c*, 1116*a-b*) is coated with a lacquer comprising a resin.
10. The slide rail (100, 1100) of any preceding clause, wherein the at least one slide surface (116*a-c*, 1116*a-b*) is at least partly coated with a lipophilic composition coating to provide a slide layer with lowered friction.
11. The slide rail (100, 1100) of any preceding clause, wherein the slide rail (100, 1100) is linear.
12. The slide rail (100) of any preceding clause, wherein a slide surface (116*a-b*) is disposed on a surface of the flange (112*a-b*) facing in a direction away from the third wall (108) of the elongate bar body (102).
13. The slide rail (100) of any preceding clause, wherein the open channel (110) is configured to receive a guide component (304) of the sliding arrangement (300).
14. The slide rail (100) of clause 13, wherein:
   an inner surface (122*a-b*) of the at least one flange (112*a-b*) comprises a blade element (308) configured to engage a corresponding surface of the guide component (304); and/or
   an inner surface (122*a-b*) of the at least one flange (112*a-b*) is configured to engage a corresponding blade element (308) of the guide component (304).
15. The slide rail (100) of any preceding clause, wherein an inner part (114*a-b*) of the at least one flange (112*a-b*) extends into the channel (110).
16. The slide rail (1100) of any of clauses 1-11, wherein the plurality of walls further comprises a fourth wall (1114) arranged between the first and second walls (104, 1106) and connected to the third wall (1108).
17. The slide rail (1100) of clause 16, wherein a first open channel (1110*a*) is formed by the first, third and fourth walls (1104, 1106, 1114), and a second open channel (1110*b*) is formed by the second, third and fourth walls (1106, 1108, 1114).
18. The slide rail (1100) of clause 17, wherein a first slide surface (1116*a*) is disposed on a surface (1120) of the third wall (1108) adjacent the first open channel (1110*a*), and a second slide surface (1116*b*) is disposed on a surface (1120) of the third wall (1108) adjacent the second open channel (1110*b*).
19. The slide rail (1100) of clause 17 or 18, wherein each open channel (1110*a*, 1110*b*) is configured to receive a respective sliding member (1300, 1300*a-b*) of a respective sliding arrangement (1014*a-b*, 1016*a-b*).
20. The slide rail (1100) of clause 19, wherein the at least one slide surface (1116*a-b*) is formed as a groove in the third wall (1108), such as a V-shaped or U-shaped track.

21. The slide rail (1100) of any of clauses 17 to 20, wherein the at least one flange (1112*a-b*) comprises:
 a first flange (1112*a*) extending away from the first open channel (1110*a*) from the first wall (1104) of the elongate bar body (1102); and
 a second flange (1112*b*) extending away from the second open channel (1110*b*) from the second wall (1106) of the elongate bar body (1102) in a direction opposite to the extension of the first flange (1112*b*).
22. The slide rail (1100) of any of clauses 16 to 21, wherein the first, second and fourth walls (1104, 1106, 1114) are arranged parallel to each other and the third wall (1108) is arranged perpendicular to the first, second and fourth walls (1104, 1106, 1114).
23. A sliding arrangement (300, 1014*a-b*, 1016*a-b*) comprising:
 a slide rail (100, 1100) as defined in any of clauses 1 to 22; and at least one sliding member (302, 1300) configured to contact a slide surface (116*a-c*, 1116*a-b*) of the slide rail (100, 1100) and slide along the slide surface (116*a-c*, 1116*a-b*) in a direction (A) parallel to the longitudinal axis of the slide rail (100, 1100).
24. The sliding arrangement (300) of clause 23, wherein the sliding member (302) comprises at least one blade element (306) extending parallel or perpendicular to the sliding direction and configured to provide the contact with the slide surface (116*a-c*).
25. The sliding arrangement (300) of clause 23 or 24, wherein the sliding member (302) is arranged to slide on a slide surface (116*a-b*) arranged on at least one flange (112*a-b*), preferably the slide surface (116*a-b*) being arranged as a groove in the flange (112*a-b*) and extending along the slide rail (100).
26. The sliding arrangement (300) of any of clauses 23 to 25, further comprising a guide component (304) arranged to be received in the open channel (110) of the slide rail (100).
27. The sliding arrangement (300) of clause 26, wherein the sliding member (302) is coupled to the guide component (304).
28. A sliding member (1300, 1300*a*, 1300*b*) for a sliding arrangement (1014*a-b*, 1016*a-b*), the sliding member comprising:
 an elongate bar body (1302) for insertion in an open channel (1110*a-b*) of a slide rail (1100) of the sliding arrangement (1014*a-b*, 1016*a-b*), the elongate bar body (1302) comprising a plurality of walls (1304, 1306, 1308) forming an open channel (1310) extending along a longitudinal axis of the sliding member (1300), wherein first and second walls (1304, 1306) are arranged opposite to each other and a third wall (1308) is arranged between the first and second walls (1304, 1306); and
 a contact portion (1312) extending in parallel to the longitudinal axis of the sliding member (1300) formed on a surface (1314) of the third wall (1308) facing away from the open channel (1310).
29. The sliding member (1300) of clause 28, wherein the slide surface (1314) has a V-shape or a U-shape.
30. The sliding member (1300) of clause 28 or 29, wherein the open channel (1310) is configured to receive a sliding screen (1400).
31. The sliding arrangement (1014*a-b*, 1016*a-b*) of clause 23, wherein the sliding member (1300) comprises a sliding member according to any of clauses 28 to 30.
32. The sliding arrangement (1014*a-b*, 1016*a-b*) of clause 31, wherein the sliding arrangement (300, 1014*a-b*, 1016*a-b*) comprises:
 a slide rail (1100) as defined in any of clauses 16 to 22;
 a first sliding member (1300*a*) according to any of clauses 28 to 30 configured to contact a first slide surface (1116*a*) of the slide rail (1100); and
 a second sliding member (1300*b*) according to any of clauses 28 to 30 configured to contact a second slide surface (1116*b*) of the slide rail (1100).
33. A sliding screen system (10, 1010) comprising:
 at least one sliding arrangement (300, 1014*a-b*, 1016*a-b*) as defined in any of clauses 23 to 32; and
 at least one sliding screen (400, 1400) connected to the sliding member (302, 1300) of the sliding arrangement (300, 1014*a-b*, 1016*a-b*).
34. The sliding screen system (10, 1010) of clause 33, wherein:
 the slide rail (100, 1100) and the sliding arrangement (300, 1014*a-b*) are arranged at a lower portion of the sliding screen system (10, 1010); and
 the flange (112*a-b*, 1112*a-b*) of the slide rail (100, 1100) is configured to bear a vertical load applied to the sliding screen system (10, 1010), for example a vertical load applied by the at least one sliding screen (400, 1400).
35. The sliding screen system (10, 1010) of clause 34, wherein a lower surface (118*a-b*, 1118*a-b*) of the flange (112*a-b*, 1112*a-b*) is configured to interface with the board (200-1, 1200-1) to support the vertical load.
36. The sliding screen system (10) of clause 34 or 35, wherein:
 the slide surface (116*a-b*) of the slide rail (100) is disposed on an upper surface (120*a-b*) of a flange (112*a-b*) of the slide rail (100).
37. The sliding screen system (10) of any of clauses 34 to 36, wherein the sliding screen (400) is coupled to a guide component (304-1) of the sliding arrangement (300-1), preferably wherein the guide component (304-1) is at least partly arranged in the channel (110) of the slide rail (100-1).
38. The sliding screen system (1010) of clause 34 or 35, comprising:
 a first sliding arrangement (1014*a*) as defined in clause 31 or 32;
 a second sliding arrangement (1014*b*) as defined in clause 31 or 32;
 a first sliding screen (1400*a*) connected to the sliding member (1300*a*) of the first sliding arrangement (1014*a*); and
 a second sliding screen (1400*b*) connected to the sliding member (1300*b*) of the second sliding arrangement (1014*b*).
39. The sliding screen system (10, 1010) of clause 33, wherein:
 the slide rail (100, 1100) and the sliding arrangement (300, 1016*a-b*) are arranged at an upper portion of the sliding screen system (10, 1010); and the slide surface (116*c*, 1116*a-b*) of the slide rail (100, 1100) is disposed on the lower surface (120*c*, 1120) of the third wall (108, 1108) of the elongate bar body.
40. The sliding screen system (10) of clause 39, wherein the sliding member (302-2) of the sliding arrangement (300-2) is coupled to a guide component (304-2), preferably wherein the guide component (304-2) is at least partly arranged in the channel (110) of the slide rail (100-2) of the sliding arrangement (300-2).

41. The sliding screen system (10) of clause 39 or 40, wherein the sliding member (302-2) of the sliding arrangement (300-2) is configured to exert a spring force against the slide surface (116*c*).

42. A sliding screen system (10, 1010) comprising:

a first slide rail (100-1, 1100-1) as defined in any of clauses 1 to 22 arranged at a lower portion of the sliding screen system (10, 1010), wherein the at least one flange (112*a-b*, 1112*a-b*) of the first slide rail (100-1, 1100-1) is configured to bear a vertical load applied to the sliding screen system (10, 1100);

at least one first sliding member (302, 1300) in contact with the slide surface (116*a-b*, 1116*a-b*) of the first slide rail (100-1, 1100-1) and configured to slide along the slide surface (116*a-b*, 1116*a-b*) in a direction (A) parallel to the longitudinal axis of the first slide rail (100-1, 1100-1);

a second slide rail (100-2, 1100-2) as defined in any of clauses 1 to 22 arranged at an upper portion of the sliding screen system (10, 1010), wherein the slide surface (116*c*, 1116*a-b*) of the second slide rail (100-2, 1100-2) is disposed on a surface (120*c*, 1120) of the third wall (108, 1108) of the elongate bar body (102, 1102) of second slide rail (100-2, 1100-2);

at least one second sliding member (302, 1300) in contact with the slide surface (116*c*, 1116*a-b*) of the second slide rail (100-2, 1100-2) and configured to slide along the slide surface (116*c*, 1116*a-b*) in a direction (A) parallel to the longitudinal axis of the second slide rail (100-2, 1100-2); and at least one sliding screen (400, 1400*a-b*) connected to the first and second sliding members (302, 1300).

43. The sliding screen system (10, 1010) of clause 42, wherein a lower surface (118*a-b*, 1118*a-b*) of the at least one flange (112*a-b*, 1112*a-b*) of the first slide rail (100-1, 1100-1) is configured to interface with a lower board (200-1, 1200-1) to support the vertical load.

44. The sliding screen system (10, 1010) of clause 42 or 43, wherein the first slide rail (100, 100-1) is arranged in the vertically opposite sense to the second slide rail (100, 100-2).

It is to be understood that the present invention is not limited to the embodiments described above and illustrated in the drawings; rather, the skilled person will recognize that many changes and modifications may be made within the scope of the appended claims.

The invention claimed is:

1. A slide rail for a sliding screen system, the slide rail comprising:

an elongate bar body for insertion in a recess of a board, the elongate bar body comprising a plurality of walls forming at least one open channel extending along a longitudinal axis of the slide rail, wherein the plurality of walls comprises a first wall and a second wall arranged opposite to each other and a third wall arranged between and connected to the first and second walls;

at least one flange extending away from the at least one open channel from a side of the elongate bar body; and at least one slide surface extending along the slide rail in parallel to the longitudinal axis of the slide rail, wherein the slide surface is formed as a groove in the slide rail and disposed on a surface of the flange facing in a direction away from the third wall of the elongate bar body, the slide surface being configured to receive a sliding member of a sliding arrangement of the sliding screen system.

2. The slide rail of claim 1, wherein a second slide surface is disposed on a surface of the third wall of the elongate bar body adjacent to the channel.

3. The slide rail of any claim 1, wherein the at least one flange extends away from the at least one open channel from a side of the elongate bar body in a plane parallel to the third wall and/or in a plane perpendicular to the first and/or second wall.

4. The slide rail of claim 1, wherein the at least one flange is configured to support a vertical load applied to the slide rail, wherein a support surface of the at least one flange facing in a direction towards the third wall of the elongate bar body is configured to interface with the board to support the vertical load.

5. The slide rail of claim 1, wherein the at least one flange comprises:

a first flange extending away from the first wall of the elongate bar body; and a second flange extending away from the second wall of the elongate bar body in a direction opposite to the extension of the first flange.

6. The slide rail of claim 1, wherein the at least one slide surface is at least partly coated with a lipophilic composition coating to provide a slide layer with lowered friction.

7. The slide rail of claim 1, wherein the open channel is configured to receive a guide component of the sliding arrangement, wherein:

an inner surface of the at least one flange comprises a blade element configured to engage a corresponding surface of the guide component; and/or an inner surface of the at least one flange is configured to engage a corresponding blade element of the guide component.

8. A sliding arrangement comprising:

a slide rail as defined in claim 1; and at least one sliding member configured to contact the slide surface of the slide rail and slide along the slide surface in a direction parallel to the longitudinal axis of the slide rail.

9. The sliding arrangement of claim 8, wherein the sliding member comprises at least one blade element extending parallel or perpendicular to the sliding direction and configured to provide the contact with the slide surface.

10. The sliding arrangement of claim 8, wherein the sliding member is arranged to slide on the slide surface arranged on at least one flange.

11. The sliding arrangement of claim 8, further comprising a guide component arranged to be received in the open channel of the slide rail, wherein the sliding member is coupled to the guide component.

12. A sliding screen system comprising:

at least one sliding arrangement as defined in claim 8; and at least one sliding screen connected to the sliding member of the sliding arrangement.

13. The sliding screen system of claim 12, wherein: the slide rail and the sliding arrangement are arranged at a lower portion of the sliding screen system; and the flange of the slide rail is configured to bear a vertical load applied to the sliding screen system.

14. The sliding screen system of claim 13, wherein a lower surface of the flange is configured to interface with the board to support the vertical load.

15. The sliding screen system of claim 13, wherein the slide surface of the slide rail is disposed on an upper surface of a flange of the slide rail.

16. The sliding screen system of claim 13, wherein the sliding screen is coupled to a guide component of the sliding arrangement, wherein the guide component is at least partly arranged in the channel of the slide rail.

17. A sliding screen system comprising:

a first slide rail as defined in claim 1 arranged at a lower portion of the sliding screen system, wherein the at least one flange of the first slide rail is configured to bear a vertical load applied to the sliding screen system;

at least one first sliding member in contact with the slide surface of the first slide rail and configured to slide along the slide surface in a direction parallel to the longitudinal axis of the first slide rail;

a second slide rail arranged at an upper portion of the sliding screen system, wherein a slide surface of the second slide rail is disposed on a surface of a third wall of the elongate bar body of the second slide rail;

at least one second sliding member in contact with the slide surface of the second slide rail and configured to slide along the slide surface in a direction parallel to the longitudinal axis of the second slide rail; and at least one sliding screen connected to the first and second sliding members.

18. The sliding screen system of claim 17, wherein a lower surface of the at least one flange of the first slide rail is configured to interface with a lower board to support the vertical load, and/or wherein the first slide rail is arranged in the vertically opposite sense to the second slide rail.

* * * * *